US009300822B2

(12) United States Patent
Matsuhara et al.

(10) Patent No.: US 9,300,822 B2
(45) Date of Patent: Mar. 29, 2016

(54) INFORMATION PROCESSING SYSTEM, INFORMATION PROCESSING DEVICE, PORTABLE INFORMATION TERMINAL AND NON-TRANSITORY COMPUTER READABLE RECORDING MEDIUM

(71) Applicant: Konica Minolta, Inc., Chiyoda-ku (JP)

(72) Inventors: Kenji Matsuhara, Kawanishi (JP); Junichi Hase, Osaka (JP); Kazusei Takahashi, Nishinomiya (JP); Kazuya Anezaki, Kobe (JP); Tomonari Yoshimura, Kyoto (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/100,311

(22) Filed: Dec. 9, 2013

(65) Prior Publication Data

US 2014/0168696 A1 Jun. 19, 2014

(30) Foreign Application Priority Data

Dec. 18, 2012 (JP) .................................. 2012-275473

(51) Int. Cl.
*G06F 15/00* (2006.01)
*H04N 1/00* (2006.01)
*H04N 1/44* (2006.01)

(52) U.S. Cl.
CPC ....... *H04N 1/00307* (2013.01); *H04N 1/00244* (2013.01); *H04N 1/00384* (2013.01); *H04N 1/00411* (2013.01); *H04N 1/4433* (2013.01)

(58) Field of Classification Search
CPC ................................................. H04N 1/00307
USPC ....................................................... 358/1.15
See application file for complete search history.

(56) References Cited

U.S. PATENT DOCUMENTS

2002/0044299 A1\* 4/2002 Iwase ..................... H04L 29/06
358/1.15
2010/0134244 A1 6/2010 Yoshida
(Continued)

FOREIGN PATENT DOCUMENTS

JP 2004-259070 A 9/2004
JP 2006-59083 A 3/2006
(Continued)

OTHER PUBLICATIONS

Office Action issued on Jan. 27, 2015, by the Japan Patent Office in corresponding Japanese Patent Application No. 2012-275473, and an English Translation of the Office Action. (10 pages).

*Primary Examiner* — Saeid Ebrahimi Dehkordy
(74) *Attorney, Agent, or Firm* — Buchanan Ingersoll & Rooney PC

(57) ABSTRACT

An information processing system has a portable information terminal and an information processing device that allow communication therebetween. The portable information terminal includes: a first application executing part for acquiring screen information indicating a screen with which a user makes remote operation from the information processing device and displaying the screen; and an informing part for sending access information as to a destination being accessed by a second application executing part to the information processing device when an application detecting part detects that both of the first and second application executing parts are running. The information processing device includes: a screen creating part for creating the screen based on the access information; and a transmitting part for sending the screen information created by the screen creating part to the portable information terminal. The first application executing part displays the screen based on the screen information received from the transmitting part.

17 Claims, 26 Drawing Sheets

(56) References Cited

U.S. PATENT DOCUMENTS

| | | |
|---|---|---|
| 2011/0019242 A1 | 1/2011 | Tajima et al. |
| 2012/0062947 A1 | 3/2012 | Shozaki |
| 2012/0243039 A1 | 9/2012 | Miyata et al. |
| 2012/0262749 A1 | 10/2012 | Yamamoto |

FOREIGN PATENT DOCUMENTS

| | | |
|---|---|---|
| JP | 2008-053979 A | 3/2008 |
| JP | 2008-067248 A | 3/2008 |
| JP | 2008-299739 A | 12/2008 |
| JP | 2009-232051 A | 10/2009 |
| JP | 2010-74682 A | 4/2010 |
| JP | 2010-134549 A | 6/2010 |
| JP | 2011-197853 A | 10/2011 |
| JP | 2012-203741 A | 10/2012 |
| JP | 2012-222721 A | 11/2012 |

* cited by examiner

FIG. 6

MANAGEMENT TABLE TB1

| No. | CLOUD SERVICE | DESTINATION ADDRESS | ADDRESS FOR INFORMATION PROCESSING DEVICE | APPLICATION |
|---|---|---|---|---|
| 1 | DOCUMENT MANAGEMENT SERVICE | http://www. ······/····· | http://www. ······/····· | APPLICATION A |
| 2 | ABC SERVICE | http://www. ······/····· | — | APPLICATION B |
| 3 | NETWORK SERVICE | http://www. ······/····· | | APPLICATION C |
| 4 | | | | |
| 5 | | | | |
| 6 | | | | |

INFORMATION PROCESSING SYSTEM, INFORMATION PROCESSING DEVICE, PORTABLE INFORMATION TERMINAL AND NON-TRANSITORY COMPUTER READABLE RECORDING MEDIUM

This application is based on the application No. 2012-275473 filed in Japan, the contents of which are hereby incorporated by reference.

BACKGROUND OF THE INVENTION

1. Field of the Invention

The present invention relates to an information processing system, an information processing device, a portable information terminal and a non-transitory computer readable recording medium. The present invention more specifically relates to a technique of operating the information processing device by remote control via a portable information terminal.

2. Description of the Background Art

Conventional information processing devices called as MFPs (Multi-Function Peripherals) including print and/or scan function are generally used in a condition of network connection and are allowed to transmit and receive a variety of data such as document data. By way of example, the information processing device is capable of sending image data generated by reading a document with scan function to a servicer over a network.

There are conventional techniques of building up cooperation among the aforementioned information processing device and other devices over the network. These known techniques are introduced for example in Japanese Patent Application Laid-Open No. JP 2010-074682 A (hereafter, document 1), Japanese Patent Application Laid-Open No. JP 2006-059083 A (hereafter, document 2) and Japanese Patent Application Laid-Open No. JP 2004-259070 A (hereafter, document 3).

According to the technique introduced in the document 1, an image processing system including a personal computer (hereafter, PC) and a MFP connected with each other to allow communication therebetween over a network has a mode to send to the PC from the MFP image data generated through reading operation on the MFP. Moreover, according to the technique introduced in the document 1, when the mode is selected on the image processing system, image data to recreate a screen displayed on a display device of the PC with a display device of the MFP is sent to the MFP from the PC, and the screen created on a basis of the screen data received from the PC is displayed on the display device of the MFP as a remote screen. Location data indicating a location given by a user through the remote screen is then sent to the PC together with scan data generated through reading operation on the MFP. The PC detects a folder displayed at the given location with the received location data, and stores the scan data received from the MFP in the detected folder.

According to the technique introduced in the document 2, a system includes an image processing device and a computer terminal connected with each other to allow communication therebetween over a network. In order to operate the computer terminal by remote control via the image processing device, the image processing device receives details of a screen displayed on the computer terminal and displays the screen with its display part. The image processing device then sends operation information showing operation input on the screen to the computer terminal.

According to the technique introduced in the document 3, a digital composite device which is capable of establishing communication with a client device including a PC, a PDA or a cell-phone over a network receives an operating condition display request from the client device. In response to receiving the request, the digital composite device creates HTML data corresponding to a model of the client device which is a sender of the operating condition display request, and sends the created HTML data to the client device.

In recent years, portable information terminals such as tablet terminals or smart phones have become widely popular. This type of portable information terminal includes a function allowing radio connection to a network such as LAN (Local Area Network) or WAN (Wide Area Network), or public phone lines. Besides the function, the portable information terminal includes a function allowing a short distance radio communication such as NFC (Near Field Communication) with a specific device.

In these days, several companies have launched cloud services providing a storage on which a variety of data such as document data can be stored over an internet. This cloud service gives a user access to the service to upload or download data any time, anywhere with the internet access, resulting in user friendliness. Especially in these days, along with the popularization of the portable information terminals such as tablet terminals or smart phones, there are increasing cases using the cloud service via the portable information terminals. It is expected that more users often use the portable information terminals in near future, to obtain image data generated by reading operation on the information processing device, then uploading the image data to the cloud service with the portable information terminals, or to make printed outputs produced with print function on the information processing device by forwarding the image data downloaded from the cloud service with the portable information terminals to the information processing device.

In view of system user friendliness, it is required that the image data generated with scan function on the information processing device is directly uploaded to the cloud service from the information processing device, or the image data stored with the cloud service is directly downloaded to the information processing device.

The information processing device placed at a place such as an office is normally shared and used by multiple users. The information processing device generally does not store therein information concerning the cloud service which is usually used by an individual user, or authentication information such as a user ID and a password to log into a user account to access the cloud service.

In those cases, when the user operates the information processing device to directly upload data to the cloud service, he or she is required to input information such as an address to access the cloud service and the authentication information such as the user ID and the password on the information processing device, and log into the cloud service via the information processing device by manual. The user needs to go through this operation by manual every time he or she accesses the cloud service via the information processing device, resulting in bothersome operation.

In order to improve the operability when accessing the cloud service via the information processing device, the information concerning the cloud service used by each user or the authentication information for each user to log into the cloud service, for example, may be registered in advance with the information processing device.

A plurality of information processing devices, however, is generally installed at the conventional offices. It is also bothersome to register in advance all the information concerning the cloud service used by all the users with every information processing device. Each company provides different services over the internet for the cloud service and each user selects the cloud service that satisfies his or her needs. In particular, some users may use more than one cloud services depending on the usage. In order to register the cloud service used by each user with the information processing device, the different service needs to be registered for each user and sometimes more than one services needs to be registered for one user. The registration operation got extremely complex. Also, when the user changes the cloud service that he or she used to use, the information registered with the information processing device needs to be updated every time the user changes the cloud service. The bothersome change operation needs to be made.

Not only for accessing the aforementioned cloud service but also for storing files such as a scan image file generated on information processing device in a specific folder on another device such as the portable information terminal or for producing a printed output on the information processing device based on the file stored on another device such as the portable information terminal, the user needs to input information such as an address to access the specific folder or file into the information processing device. The information should be entered by manual every time the user operates the information processing device to access the specific folder or the file. Again, the bothersome operation needs to be made.

None of the techniques introduced in the documents 1 to 3 solves the above-described problems.

SUMMARY OF THE INVENTION

The present invention is intended to solve the above problems. Thus, the present invention is intended to provide an information processing system, an information processing device, a portable information terminal and a non-transitory computer readable recording medium capable of realizing enhanced operability of accessing a destination including a cloud service used by a user or a specific folder via the information processing device, and allowing direct data communication between the information processing device and the destination without bothersome manual operation.

First, the present invention is directed to an information processing system comprises a portable information terminal and an information processing device that allow communication therebetween. The portable information terminal operates said information processing device by remote control.

According to an aspect of the information processing system, the portable information terminal includes: a first application executing part for acquiring screen information indicating a screen, with which a user makes remote operation, from said information processing device and displaying the screen based on the acquired screen information; a second application executing part which is different from said first application executing part; an application detecting part for detecting running operation of said first and second application executing parts; and an informing part for sending access information as to a destination being accessed by said second application executing part to said information processing device when said application detecting part detects that both of said first and second application executing parts are running. The information processing device includes: a screen creating part for creating the screen based on said access information in response to receiving said access information; and a transmitting part for sending the screen information indicating the screen created by said screen creating part to said portable information terminal. The first application executing part displays the screen based on the screen information received from said transmitting part.

Second, the present invention is directed to an information processing device capable of establishing communication with a portable information terminal. The information processing device is operated by remote control via said portable information terminal.

According to one aspect of the information processing device, the information processing device, comprises: a screen creating part for creating a screen based on access information in response to receiving said access information as to a destination accessed by said portable information terminal; and a transmitting part for sending screen information indicating the screen created by said screen creating part to said portable information terminal.

Third, the present invention is directed to a non-transitory computer readable recording medium on which a program is recorded. The program is executable on an information processing device capable of establishing communication with a portable information terminal. The program causes said information processing device to be operated by remote control via said portable information terminal.

According to one aspect of the non-transitory computer readable recording medium, the program executed on the information processing device to function as a system comprises: a screen creating part for creating a screen based on access information in response to receiving said access information as to a destination accessed by said portable information terminal; and a transmitting part for sending screen information indicating the screen created by said screen creating part to said portable information terminal.

Forth, the present invention is directed to a non-transitory computer readable recording medium on which a program is recorded. The program is executable on a portable information terminal capable of operating an information processing device by remote control with a communication function.

According to an aspect of the non-transitory computer readable recording medium, the program executed on the portable information terminal to function as a system comprises: a first application executing part for acquiring screen information indicating the screen, with which the user makes remote operation, and displaying the screen based on said acquired screen information; an application detecting part for detecting running operation of said first application executing part and a second application executing part which is different from said first application executing part; and an informing part for sending access information as to a destination accessed by said second application executing part to said information processing device when said application detecting part detects that both of said first and second application executing parts are running.

Fifth, the present invention is directed to a portable information terminal capable of operating an information processing device by remote control with a communication function.

According to one aspect of the portable information terminal, the portable information terminal, comprises: a first application executing part for acquiring screen information indicating a screen, with which the user makes remote operation, and displaying the screen based on said acquired screen information; an application detecting part for detecting running operation of said first application executing part and a second application executing part which is different from said first application executing part; and an informing part for sending access information as to a destination accessed by said second application executing part to said information processing device when said application detecting part detects that both of said first and second application executing parts are running.

BRIEF DESCRIPTION OF THE DRAWINGS

FIG. 6 is an example of a management table managed by the management part;

DESCRIPTION OF THE PRESENT PREFERRED EMBODIMENTS

Figure 1:
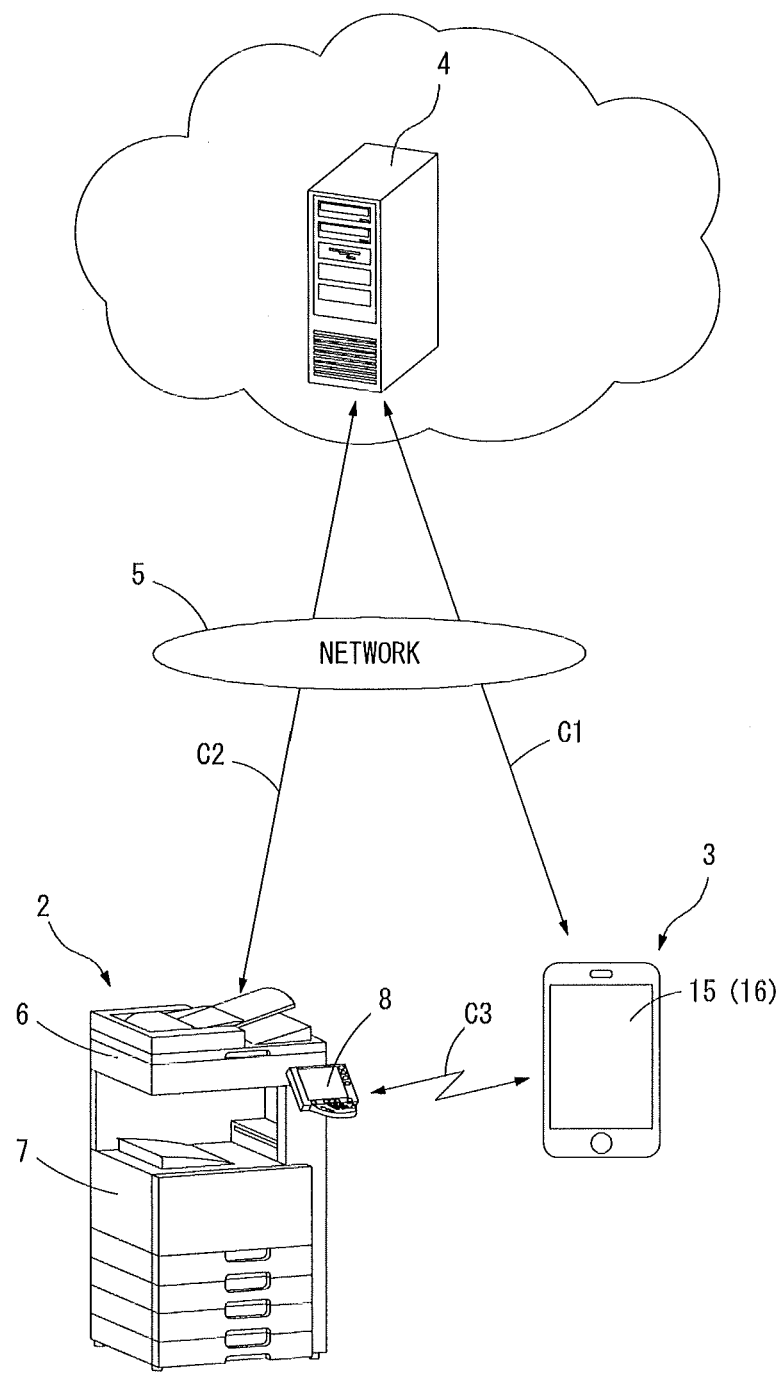
FIG. 1 shows an exemplary configuration of an information processing system.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an information processing system 1. The information processing system 1 of FIG. 1 comprises an information processing device 2 formed from a device such as one of MFPs and a portable information terminal 3 used by a user with usually carrying it with him or her. On the information processing system 1 of the present preferred embodiment, each of the information processing device 2 and the portable information terminal 3 is capable of accessing a service providing server 4 that provides a cloud service over a network 5. The network 5 includes LAN, WAN, public phone lines and/or internet networks.

The information processing device 2 has multiple functions including scan function, print function and box function, for example, besides function to establish data communication over the network 5.

Scan function is to drive a scanner section 6 provided at the upper part of the device body of the information processing device 2, for example, to read an image of a document and to generate an image file (a scan image file) of the read document. Print function is to drive a printer section 7 provided at the central part of the device body of the information processing device 2, for example, and to produce a printed output. Box function is to store a variety of data in a storage region (a folder) described later. The scan image file generated with scan function or data received over the network 5, for example, is stored in the storage region.

These scan, print and box functions may operate in relative to data communication function to establish data communication over the network 5. For scan function, for instance, the scan image file generated by reading operation of the document may be sent to outside by data communication function. For print function, the printed output may be produced based on the image file acquired from outside by data communication function. This type of information processing device 2 placed at a place such as an office is used by multiple users.

The information processing device 2 is provided with an operational panel 8 which is a user interface operable by a user in use of the information processing device 2 at the front part of the device body of the information processing device 2, for example. The information processing device 2 puts at least one of the above-mentioned multiple functions into operation to execute a job specified by the user based on user's instruction given through the operational panel 8.

The information processing device 2 includes a function to establish a short distance radio communication with a specific device placed within a range of a predetermined distance with NFC and so on. The information processing device 2 including short distance radio communication function is capable of establishing communication one-to-one with the portable information terminal 3 carried by the user who is trying to use the information processing device 2.

The portable information terminal 3 is a portable information terminal device formed from a device such as a tablet terminal or a smart phone. The portable information terminal 3 is owned by an individual user. The portable information terminal 3 includes two types of radio communication functions. One is to establish data communication with other devices over the network 5 (hereafter, network communication function) and another is to establish short distance radio communication with the information processing device 2 in case that the information processing device 2 is placed in the range of the predetermined distance for NFC and so on (hereafter, short distance radio communication function).

The portable information terminal 3 of the present preferred embodiment has display function to display an image or an operation screen (hereafter, screen). With the display function, the user is allowed to browse images stored on the portable information terminal 3 or images stored on the information processing device 2 or the service providing server 4. Moreover, the user is allowed to perform an intended input on a variety of screens described later.

The portable information terminal 3 of the present preferred embodiment has shooting function to shoot a light figure of an object and a play function to display an image obtained through shooting. With those functions, the user is allowed to shoot any object and view the shot image.

Various types of application programs (hereafter, applications) are allowed to be installed on the portable information terminal 3. The application for cloud service (hereafter, cloud service application) to use the cloud service provided by the service providing server 4, for instance, may be installed in advance on the portable information terminal 3. With running the cloud service application installed on the portable information terminal 3, the user may use the cloud service provided by the service providing server 4 any time, anywhere he or she wants through the portable information terminal 3.

As another one of the applications that may be installed on the portable information terminal 3, there is the remote control application to operate the information processing device 2 by remote control via the portable information terminal 3 with the short distance radio communication function. With running the remote control application installed on the portable information terminal 3, the same screen as the screen displayed on the operational panel 8 of the information processing device 2 may be displayed on the portable information terminal 3. The user is allowed to operate the information processing device 2 by remote control through short distance radio communication C3 between the portable information terminal 3 and the information processing device 2 by operating the screen displayed on the portable information terminal 3.

As even another one of the applications that may be installed on the portable information terminal 3, there is the file creation application to open the folder stored on the service providing server 4, the portable information terminal 3 or the information processing device 2 to make the contents of the folder viewable for the user, or to edit a file (data) in the folder. The service providing server 4, the portable information terminal 3 and the information processing device 2 include storage regions as folders in which a variety of data is stored.

With the application installed on the portable information terminal 3, the file creation application runs when the user gives an instruction to open a specific folder. In response to running the application, the contents of the folder is opened. The user is allowed to view the contents of a file in the folder. When the user gives the instruction to open the file (data) in the folder, the file is opened, and file editing becomes available.

As even another one of the applications that may be installed on the portable information terminal 3, there is the shooting and play application to enable shooting and/or play function. With running the application installed on the portable information terminal 3, the screen including live view images and a variety of operational keys relating to shooting and play is displayed on the portable information terminal 3. The user presses the operational keys, thereby shooting the intended object or playing the shot images to view.

The service providing server 4 is installed on the internet, for example, and provides a variety of cloud services over the internet. The service providing server 4 creates an account for each registered user, for example, and sets a predetermined dedicated data storage region for each account, available for each registered user. The service providing server 4 provides the service for the registered user to upload data to the respective data storage region over the network 5, or to download data in the respective data storage region. This type of service providing server 4 is generally installed on the internet and the number of which is not just one. The example of FIG. 1 shows only one of the service providing servers 4 generally installed on the internet.

On the information processing system 1 configured as described above, the user normally uses his or her portable information terminal 3 to establish connection C1 with the service providing server 4, thereby using the cloud service provided by the service providing server 4.

The user sometimes would like to upload the scan image file generated by reading operation of the document on the information processing device 2 directly to the cloud service or to download the file stored with the cloud service directly to the information processing device 2 and produce the printed output based on the downloaded file, for example.

In such a case, on the information processing system 1 of the present preferred embodiment, the remote control application is caused to run while the cloud service is being used through the portable information terminal 3. In response to running the remote control application, access information to access the service providing server 4 providing the cloud service used by the user is sent to the information processing device 2 from the portable information terminal 3. The information processing device 2 then newly creates the operation screen in response to receiving the access information. The newly created operation screen includes operational keys that are created based on the access information received from the portable information terminal 3. By pressing the included operational keys (hereafter, abbreviated keys), the user is allowed to input an instruction to make a series of processing for direct file transmission and receipt between the information processing device 2 and the service providing server 4 performed all at once by establishing connection C2 between the information processing device 2 and the service providing server 4. The information processing device 2 sends screen data of the created screen to the portable information terminal 3. In response to receiving the screen data, the portable information terminal 3 displays the screen based on the screen data.

When the user would like to use the cloud service with the information processing device 2, he or she is only required to press the abbreviated keys of the screen displayed on the portable information terminal 3 without performing bothersome operations like inputting information concerning the destination into the information processing device 2. The abbreviated keys are displayed on the operation screen in response to running the remote control application. As a result, direct data communication between the information processing device 2 and the service providing server 4 becomes available with simple operation.

The access information is sent to the information processing device 2 not only when the cloud service is being used with running the cloud service application. Also, when, for example, the file creation application or the shooting and play application is running and the application is accessing the specific folder or file, the remote control application on the portable information terminal 3 sends the access information for direct access to the specific folder or file to the information processing device 2. Even in this case, the information processing device 2 creates the screen relating to the destination where the creation application or the shooting and play application is accessing based on the access information received from the portable information terminal 3. The information processing device 2 then sends the created screen to the portable information terminal 3. The portable information terminal 3 displays the operation screen received from the information processing device 2.

The user may run the remote control application with viewing the specific folder or file displayed on the portable information terminal 3 by running the file creation application or the shooting and play application. Even in such a case, it is not necessary for the user to repeatedly perform the same inputs with the remote control application as he or she performed with the file creation application or the shooting and play application. Details of the portable information terminal 3 and the information processing device 2 are described hereinafter.

Figure 2:
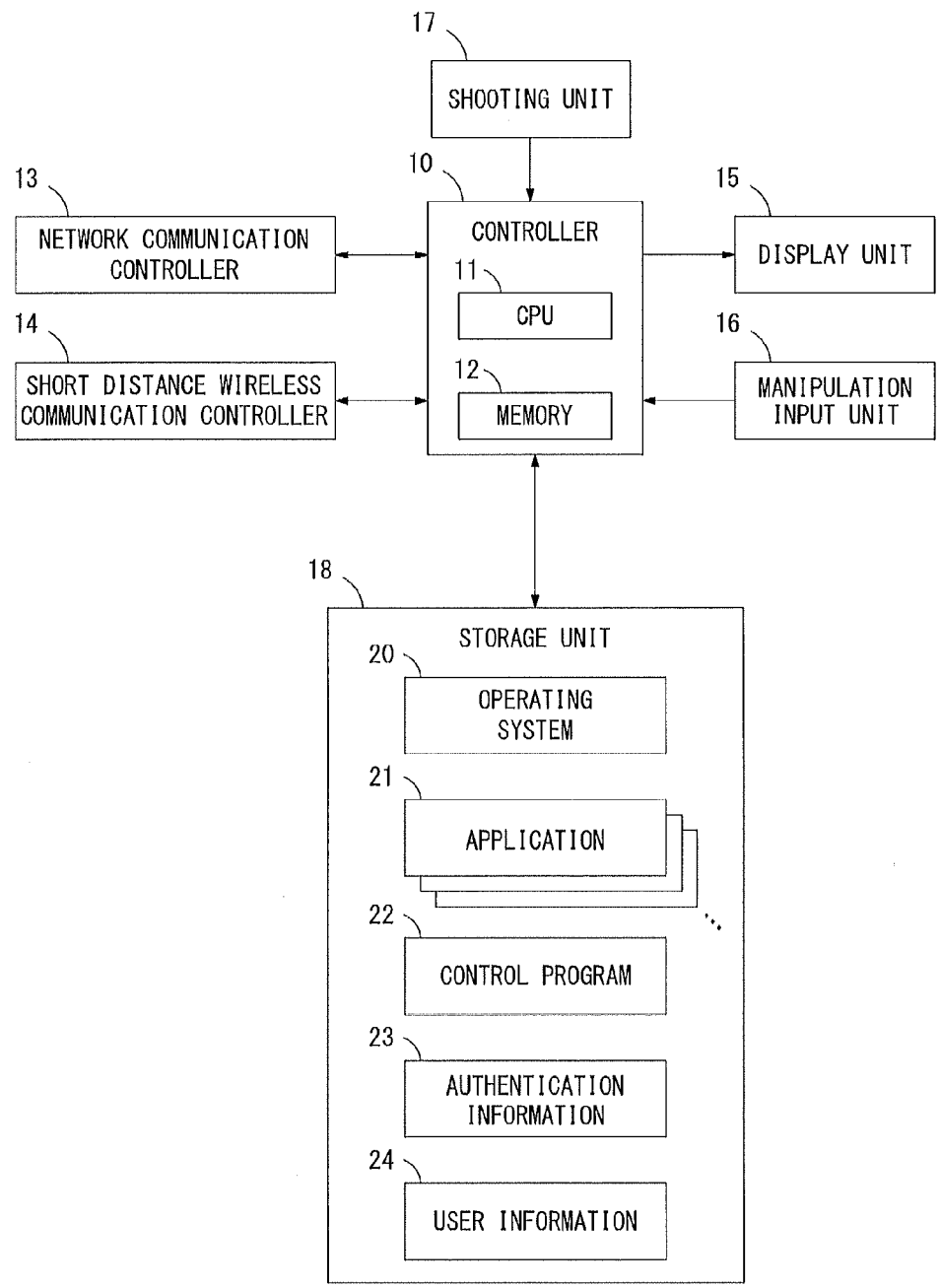
FIG. 2 is a block diagram showing an exemplary hardware configuration of a portable information terminal.

The portable information terminal 3 is described next. FIG. 2 is a block diagram showing an exemplary hardware configuration of the portable information terminal 3. As illustrated in FIG. 2, the portable information terminal 3 includes a controller 10, a network communication controller 13, a short distance radio communication controller 14, a display unit 15, a manipulation input unit 16, a shooting unit 17 and a storage unit 18. The portable information terminal 3 formed from the device such as the smart phone includes a microphone or a speaker.

The controller 10 including a CPU 11 and a memory 12 controls operations of each processing part. The CPU 11 executes various types of applications stored on the storage unit 18. The memory 12 stores therein data such as temporary data required in accordance with execution of each application by the CPU 11.

The network communication controller 13 controls data communication when the data communication is established over the network 5 by the controller 10. The short distance radio communication controller 14 controls short distance radio communication when the short distance radio communication is established with the information processing device 2 by the controller 10. Once the short distance radio communication becomes available with the information processing device 2, for example, the short distance radio communication controller 14 automatically detects it and notifies the controller 10.

The display unit 15 on which various types of information is displayed to the user of the portable information terminal 3 is formed from a device such as a color liquid crystal display, for example. The manipulation input unit 16 formed with parts such as touch panel sensors arranged on the screen of the display unit 15, for example, receives inputs by the user of the portable information terminal 3. The shooting unit 17 includes some parts, not shown in FIG. 2, such as an image pickup sensor like CCD (Charge Coupled Device) that converts object lights into electronic signal, an optical system that leads object lights to the image pickup sensor, an emission part that outputs flash lights and so on.

The storage unit 18 is formed from a nonvolatile storage device such as a solid state drive (SSD). The storage unit 18 stores therein as programs executed by the CPU 11 an operating system 20 which is a basic application of the portable information terminal 3, a plurality of application programs 21 used by the user and a controlling program 22 for making the controller 10 serve as a connection controller 40 described later.

The plurality of applications 21 include the aforementioned cloud service application, by running which the portable information terminal 3 is allowed to access the service providing server 4 and use the cloud service. When, for example, more than one cloud services is used by the user, the plurality of applications 21 each of which corresponds to the respective cloud services are stored in the storage unit 18.

Also, the applications 21 include the remote control application, the file creation application and the shooting and play application. The remote control application is run to control the operation of the information processing device 2 by remote control via the portable information terminal 3 with short distance radio communication function, and the file creation application is run to open the folder stored on the service providing server 4, the portable information terminal 3 or the information processing device 2 to make the contents of the folder viewable for the user or to edit the file (data) in the folder. The shooting and play application is run to enable shooting function and play function.

The storage unit 18 stores therein authentication information 23 and user information 24 besides the above described applications.

The authentication information 23 is used when the portable information terminal 3 accesses the service providing server 4 to log into a user-specific account. The authentication information 23 is information about a user ID or a password registered in advance with the service providing server 4. For the user using more than one cloud services, the authentication information 23 is stored for each cloud service.

The user information 24 is information required for the use of the information processing device 2 and concerning the user of the portable information terminal 3. The portable information terminal 3 sends the user information 24 to the information processing device 2, thereby making the information processing device 2 perform user authentication to authenticate the user.

As the portable information terminal 3 is powered on, the CPU 11 automatically reads and executes the operating system 20, then automatically reading and executing the control program 22. The CPU 11 then reads and executes the user specified application 21 in response to an application start up instruction by the user.

Figure 3:
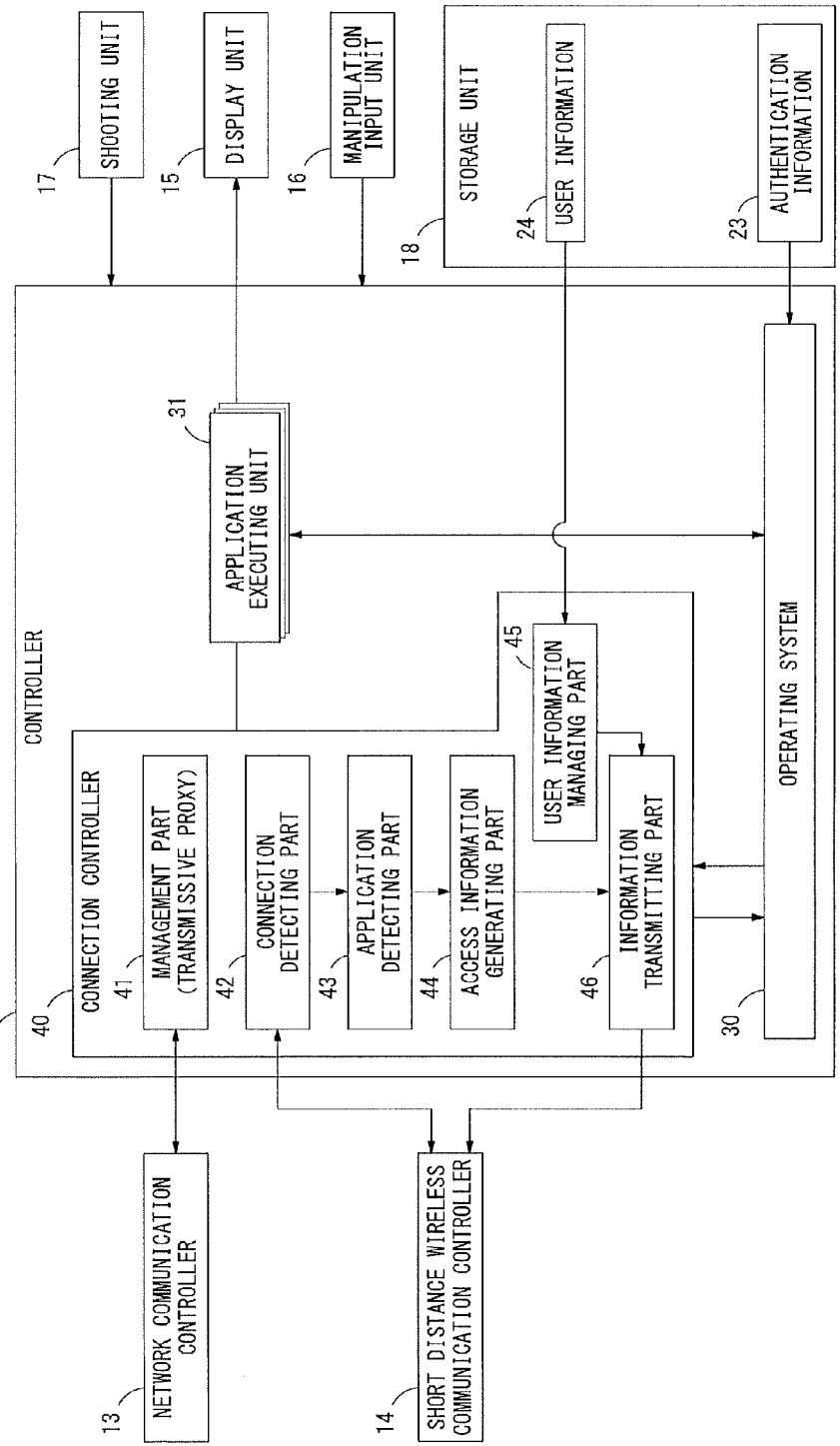
FIG. 3 is a block diagram showing an exemplary functional configuration of a controller on the portable information terminal.

FIG. 3 is a block diagram showing an exemplary functional configuration of the controller 10 realized as each of the applications is being run by the CPU 11 as described above.

As shown in FIG. 3, in response to the execution of the operating system 20, the control program 22 and the plurality of applications 21 by the CPU 11, the controller 10 serves as an operating system 30, the connection controller 40 and an application executing unit 31.

The operating system 30 is run in response to execution of the operating system 20 by the CPU 11 to control basic overall operations of the portable information terminal 3. The connection controller 40 becomes operative in response to execution of the control program 22 by the CPU 11. The connection controller 40 is resident in the controller 10 while the operating system 30 is running.

Figure 4:
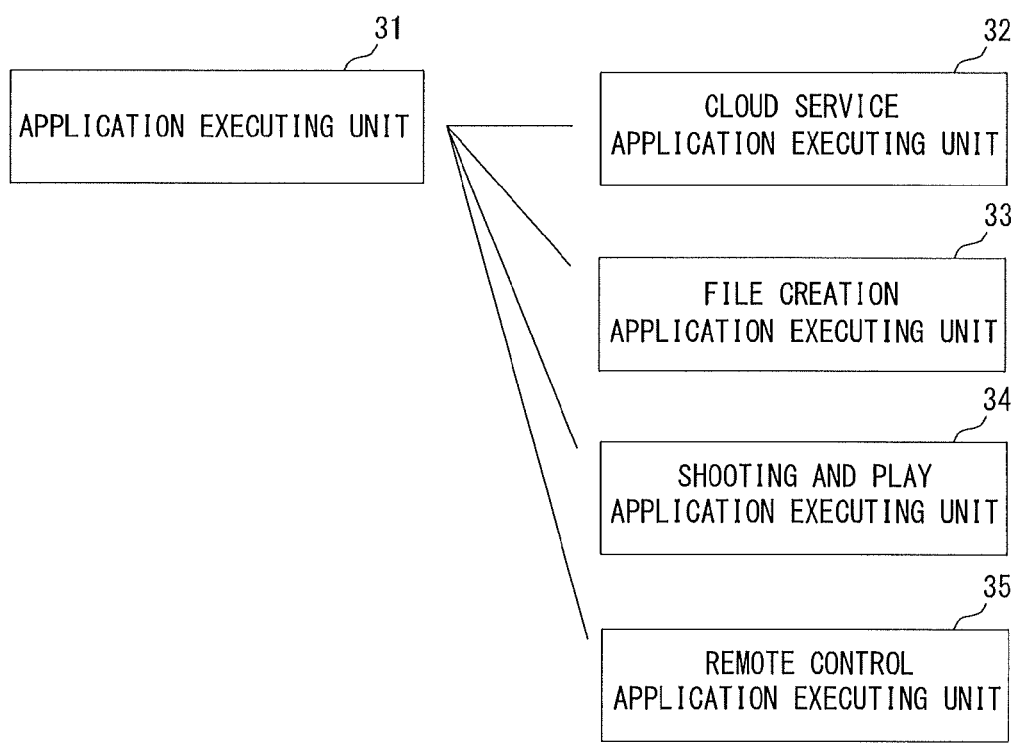
FIG. 4 shows types of application executing units.

The application executing unit 31 extends a specific application function to the portable information terminal 3. As illustrated in FIG. 4, the application executing unit 31 executing the cloud service application is called a cloud service application executing unit 32, the application executing unit 31 executing the file creation application is called a file creation application executing unit 33, the application executing unit 31 executing the shooting and play application is called a shooting and play application executing unit 34, and the application executing unit 31 executing the remote control application is called a remote control application executing unit 35.

The cloud service application executing unit 32 is a part for accessing the predetermined service providing server 4 over the network 5 and making the cloud service provided by the service providing server 4 available on the portable information terminal 3. The file creation application executing unit 33 is a part for opening the folder stored on the service providing server 4, the portable information terminal 3 or the information processing device 2 to make the contents of the folder viewable for the user or editing the file (data) in the folder based on the user's instruction. The shooting and play application executing unit 34 is a part for performing a variety of processing necessary for making the shooting unit 17 shoot or displaying the shot images on the portable information terminal 3. The remote control application executing unit 35 is a part for performing a variety of processing necessary for operating the information processing device 2 by remote control via the portable information terminal 3.

The remote control application executing unit 35 corresponds to the first application executing unit of the present invention. The cloud service application executing unit 32, the file creation application executing unit 33 and the shooting and play application executing unit 34 are an example of the second application executing unit of the present invention.

The operating system 30 not only starts up and terminates each of the application executing unit 32, 33 34 and 35 in response to the user's instruction but also manages the running application executing unit. Each of the application executing unit 32, 33 34 and 35 may be simultaneously run in parallel. In order to avoid complexity of explanation, in the following descriptions, only one of the application executing units 32, 33 and 34 is run besides the remote control application executing unit 35 as the remote control application executing unit 35 is in operation.

The operating system 30 manages the authentication information 23 used by the cloud service application executing unit 32 for access to the service providing server 4 and log-in to the user-specific account of the cloud service application executing unit 32. After the cloud service application executing unit 32 is brought into operation, it reads the authentication information 23 from the operating system 30 and logs into the user's account of the service providing server 4 with the read authentication information 23. The cloud service application executing unit 32 then displays the screen for using the cloud service on the portable information terminal 3 based on the information received from the service providing server 4.

The connection controller 40 being resident in the controller 10 detects the access to the service providing server 4 when the cloud service application executing unit 32 accesses the service providing server 4 via the network communication controller 13. The connection controller 40 manages the cloud service application executing unit 32 and the service providing server 4 which is accessed by the cloud service application executing unit 32 by associating with each other.

Once the short distance radio communication with the information processing device 2 becomes available for the short distance radio communication controller 14 after the remote control application executing unit 35 is brought into operation, the connection controller 40 detects that the short distance radio communication is available.

As shown in FIG. 3, the connection controller 40 includes a management part 41, a connection detecting part 42, an application detecting part 43, an access information generating part 44, a user information managing part 45 and an information transmitting part 46.

The management part 41 serves as a transmissive proxy when the cloud service application executing unit 32 establishes network communication via the network communication controller 13. For network communication, the cloud service application executing unit 32 sends and receives the data through the management part 41. After detecting that the cloud service application executing unit 32 is trying to establish network communication, the management part 41 extracts a destination address such as URL (Uniform Resource Locator), for example, and determines whether or not the destination is the service providing server 4.

Some of the application executing units 31 in operation on the portable information terminal 3 establish network communication but do not access the cloud service. The management part 41, therefore, determines whether or not the destination accessed by the cloud service application executing unit 32 is the service providing server 4. If the destination is the service providing server 4 as a result of the determination, the management part 41 associates the cloud service application executing unit 32 and the service providing server 4 with each other one-to-one and manages.

Figure 5:
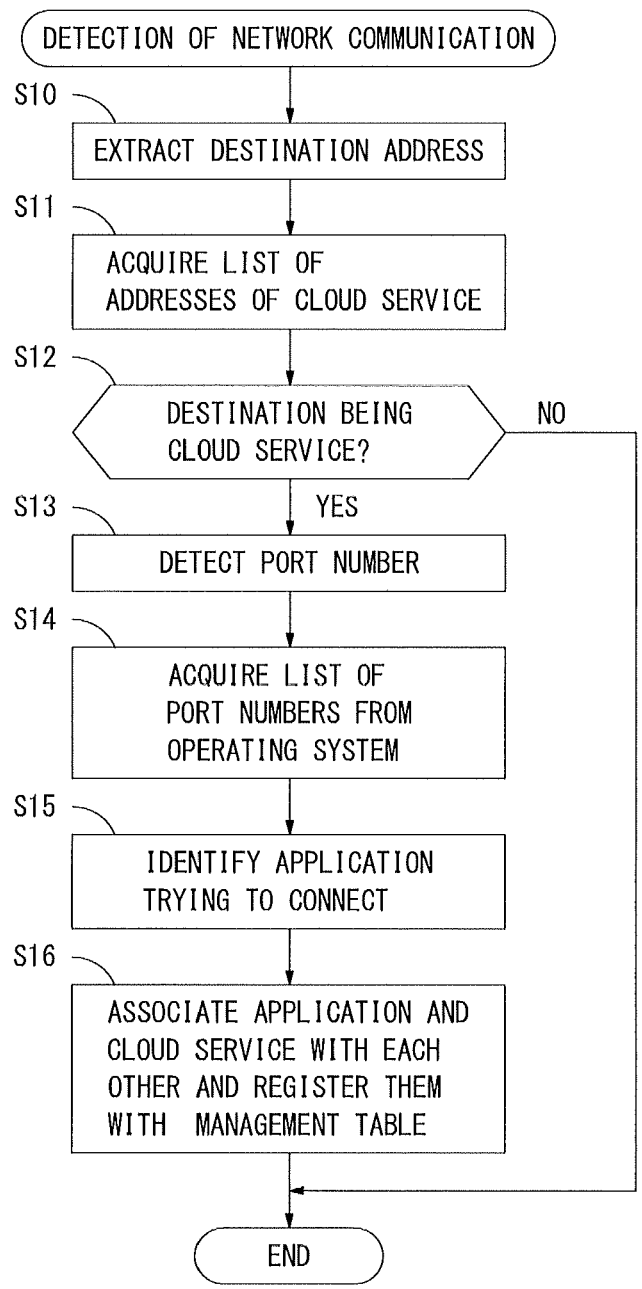
FIG. 5 is a flow diagram explaining an exemplary sequential procedure of the process performed by a management part resident in the portable information terminal.

FIG. 5 is a flow diagram explaining an exemplary sequential procedure of the process performed by the management part 41. This process is performed in response to detection by the management part 41 of the information sent from the cloud service application executing unit 32 over the network 5. When detecting that the network communication is established by the cloud service application executing unit 32, the management part 41 starts this process shown in FIG. 5 to extract the destination address from among the information output from the cloud service application executing unit 32 (step S10). The management part 41 then reads a management table TB1 managed in the memory 12 or the storage unit 18 and acquires a list of addresses of the cloud services (the service providing servers 4) from the management table TB1 (step S11).

FIG. 6 is an example of the management table TB1 managed by the management part 41. More than one cloud services used by the user, for example, is registered in the management table TB1. For each cloud service, a cloud service name D1, a destination address D2 for accessing the service providing server 4 by the portable information terminal 3, an address for information processing device D3 for accessing the service providing server 4 by the information processing device 2 and an application D4 using the cloud service are registered in the management table TB1 which is table information. This management table TB1 is created at installation of the control program 22, for example.

Information concerning the cloud service used by the user (the cloud service name D1, the destination address D2 and the address for information processing device D3) is then registered in advance by the user with the created management table TB1. An address to access a top page of web pages for use in the cloud service, for example, is registered as the destination address D2. An address to directly access the user-specific account of the web pages for use in the cloud service, for example, is registered as the address for information processing device D3. If the cloud service does not accept the direct access to the user specific-account, the address for information processing device D3 is not necessarily registered.

Referring back to FIG. 5, the management part 41 acquires the list of the destination address D2 of the above-described management table TB1 and determines whether or not the destination accessed by the cloud service application executing unit 32 is the service providing server 4 (step S12). More specifically, it is determined that the destination address extracted from the information output from the cloud service application executing unit 32 is registered with the list of the destination address D2. If the destination accessed by the cloud service application executing unit 32 is not the service providing server 4 as the result of the determination (when a result of step S12 is NO), the process performed by the management part 41 is complete.

If the destination connected by the cloud service application executing unit 32 is the service providing server 4 (when a result of step S12 is YES), the management part 41 detects a port number which is used in network communication by the cloud service application executing unit 32 based on the information output from the cloud service application executing unit 32 (step S13). The operating system 30 individually assigns a unique port number to the application executing unit 31 which establishes network communication. The management part 41 acquires a list of the port numbers used by cloud service application executing unit 32 from the operating system 30 (step S14), and identifies the cloud service application executing unit 32 which is trying to access the service providing server 4 based on the port number detected in step S13 (step S15). The management part 41 then registers the identified cloud service application executing unit 32 as the application D4 of the management table TB1, thereby associating the cloud service application executing unit 32 and the service providing server 4 with each other one-to-one and registering it with the management table TB1 (step S16).

Referring back to FIG. 3, the connection detecting part 42 detects establishment of the connection with the information processing device 2 allowing the short distance wireless communication therebetween via the short distance wireless communication controller 14 by running the remote control application executing unit 35. As described above, once the short distance wireless communication becomes available between the portable information terminal 3 and the information processing device 2 after running the remote control application executing unit 35, the short distance wireless communication controller 14 automatically detects the available status and notifies the controller 10. The connection detecting part 42 detects the connection with the information processing device 2 allowing the short distance wireless communication therebetween by receiving the notification of the connection status.

In response to the detection of the connection with the information processing device 2 by the connection detecting part 42, the application detecting part 43, the access information generating part 44 and the information transmitting part 46 are put into operation to function in series on the connection controller 40. The user information managing part 45 manages the user information 24 required to use the information processing device 2 in the storage unit 18, for example.

The application detecting part 43 detects the application executing unit 31 running on the controller 10. As the connection with the information processing device 2 is detected by the connection detecting part 42, the application detecting part 43 makes an inquiry to the operating system 30 what application executing unit 31 is currently running. In response to the inquiry from the application detecting part 43, the operating system 30 notifies the application detecting part 43 whether or not there is the current running application executing unit 31 and the current running application executing unit 31 if there is any running application executing unit 31.

After the running application executing unit 31 is detected by the application detecting part 43, the access information generating part 44 generates the access information indicating the address (destination) to which the information processing device 2 should make an access.

When the running application executing unit 31 is the cloud service application executing unit 32, the access information generating part 44 reads the management table TB1 managed by the management part 41. By referring to the management table TB1, the access information generating part 44 identifies the cloud service accessed by the cloud service application executing unit 32.

The access information generating part 44 generates the access information to access the identified service providing server 4 by the information processing device 2. This access information is an address such as URL to access the cloud service by directly connecting to the service providing server 4 over the network 5 from the information processing device 2. More specifically, when the address for the information processing device D3 corresponding to the identified cloud service is registered with the management table TB1, the access information generating part 44 reads the address for the information processing device D3 and generates the access information. If no address is registered as the address for the information processing device D3 corresponding to the identified cloud service, the access information generating part 44 reads the destination address D2 corresponding to the identified cloud service and generates the access information.

When the running application executing unit 31 is the file creation application executing unit 33 and the folder is opened by the file creation application executing unit 33, the access information generating part 44 generates the address of the currently opened folder as the access information.

When the running application executing unit 31 is the shooting and play application executing unit 34 and the portable information terminal 3 is in play mode to play the shot images, the access information generating part 44 generates the address of the shot images currently displayed on the portable information terminal 3 as the access information.

The information transmitting part 46 sends the information to the information processing device 2 via the short distance wireless communication controller 14. After the access information is generated by the access information generating part 44, the information transmitting part 46 acquires the generated access information. The information transmitting part 46 also acquires the user information 24 managed by the user information managing part 45.

The information transmitting part 46 also acquires from the operating system 30 the authentication information 23 required to access the cloud service identified by the access information generating part 44 when the acquired access information is that to access the cloud service by the information processing device 2.

The information transmitting part 46 then outputs the access information, the authentication information 23 and the user information 24 to the short distance wireless communication controller 14, thereby sending the information to the information processing device 2.

As a result, the information processing device 2 is allowed to acquire the information that is the destination for the network communication to access the cloud service, the address of the file for access to the file such as the scan image file, for instance, generated on the information processing device 2 or the address of the image file showing the shot image currently played on the portable information terminal 3.

The information transmitting part 46 sends the authentication information 23 to the information processing device 2, so that the information processing device 2 is allowed to automatically log into the user-specific account of the cloud service with the authentication information 23 when connecting to the cloud service. The information transmitting part 46 sends the user information 24, so that the information processing device 2 is allowed to perform user authentication based on the user information 24.

The information transmitting part 46 sends and receives to and from the information processing device 2 the screen data received from the information processing device 2 and/or the operation information showing the input on the manipulation input unit 16.

Figure 7:
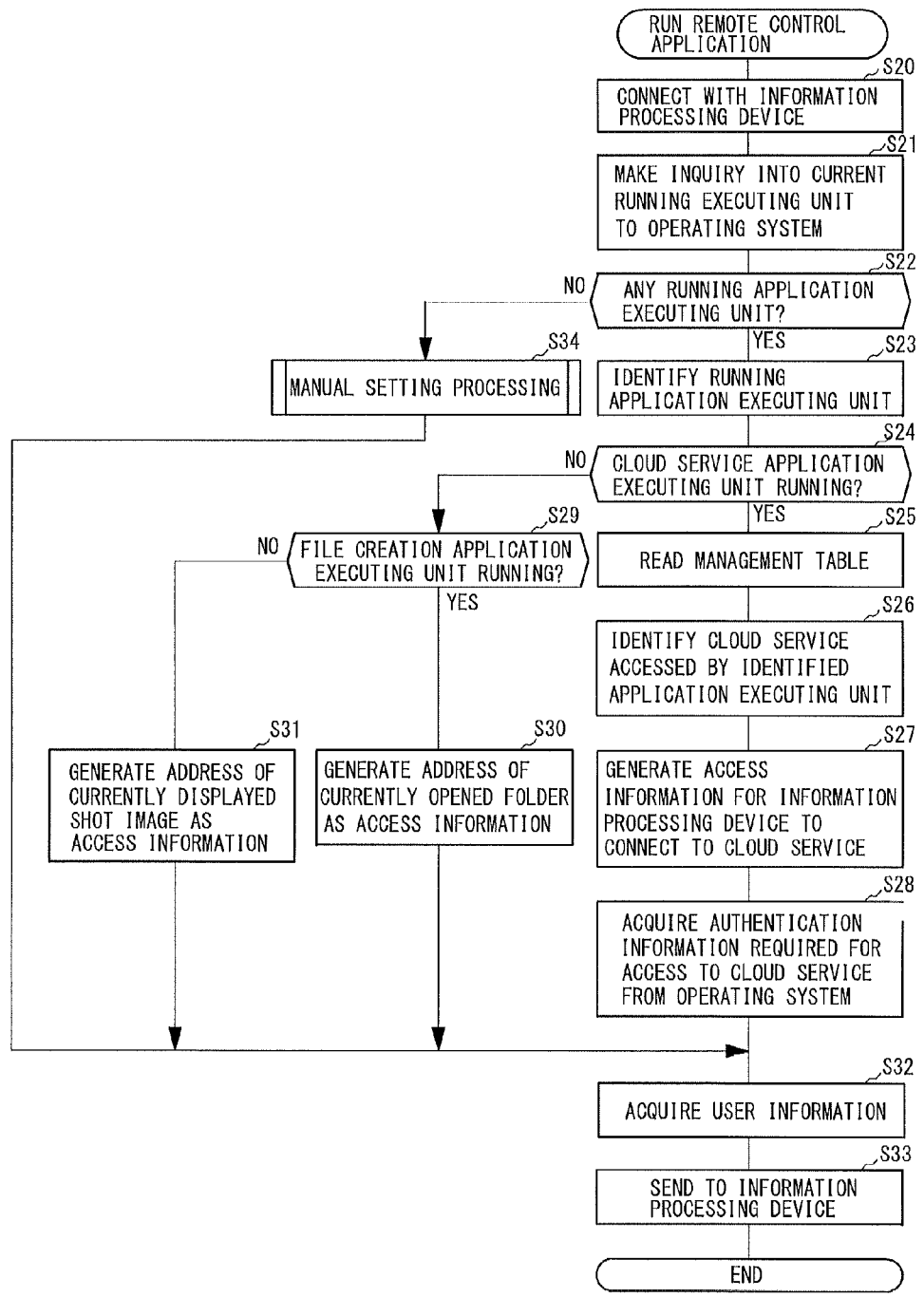
FIG. 7 is a flow diagram explaining an exemplary sequential procedure of the process performed when the portable information terminal establishes communication with an information processing device.

FIG. 7 is a flow diagram explaining an exemplary sequential procedure of the process performed by the connection detecting part 42, the application detecting part 43, the access information generating part 44 and the information transmitting part 46. This process is started on the connection controller 40 upon the detection of the connection with the information processing device 2 by the connection detecting part 42.

As the connection with the information processing device 2 is established by running the remote control application executing unit 35 (step S20), the application detecting part 43 makes an inquiry into the current running application executing unit 31 besides the remote control application executing unit 35 to the operating system 30 (step S21). If that kind of application executing unit 31 is running (when a result of step S22 is YES), the application detecting part 43 identifies the running application executing unit 31 based on the notification from the operating system 30 (step S23).

When the identified application executing unit 31 is the cloud service application executing unit 32 (when a result of step S24 is YES), the access information generating part 44 reads the management table TB1 (step S25) and identifies the cloud service accessed by the cloud service application executing unit 32 (step S26). Then the access information generating part 44 generates the access information for the information processing device 2 to directly connect to the cloud service the same as that accessed by the cloud service application executing unit 32 (step S27). The information transmitting part 46 acquires the authentication information 23 required for the access to the cloud service which is being accessed by the cloud service application executing unit 32 from the operating system 30 (step S28).

If the application executing unit 31 identified in step S23 is not the cloud service application executing unit 32 (when a result of step S24 is NO), the identified application executing unit 31 may be the file creation application executing unit 33 (when a result of step S29 is YES). In this case, the access information generating part 44 generates the address of the currently opened folder as the access information (step S30).

When the application executing unit 31 identified in step S23 is the shooting and play application executing unit 34 (when a result of step S29 is NO), the access information generating part 44 generates the address of the image file showing the shot image currently displayed on the portable information terminal 3 as the access information (step S31).

The information transmitting part 46 acquires the user information 24 managed by the user information managing part 45 after processing in step S28, S30 or S31 (step S32). The connection controller 40 then sends the acquired information to the information processing device 2 via the short distance wireless communication controller 14 (step S33).

As a result, the connection controller 40 is allowed to make the information processing device 2 perform user authentication without any operation made by the user.

When no application executing unit 31 is running as a result of the inquiry into the current running application executing unit 31 to the operating system 30 (when a result of step S22 is NO), the remote control application executing unit 35 performs manual setting processing described later (step S34).

Figure 8:
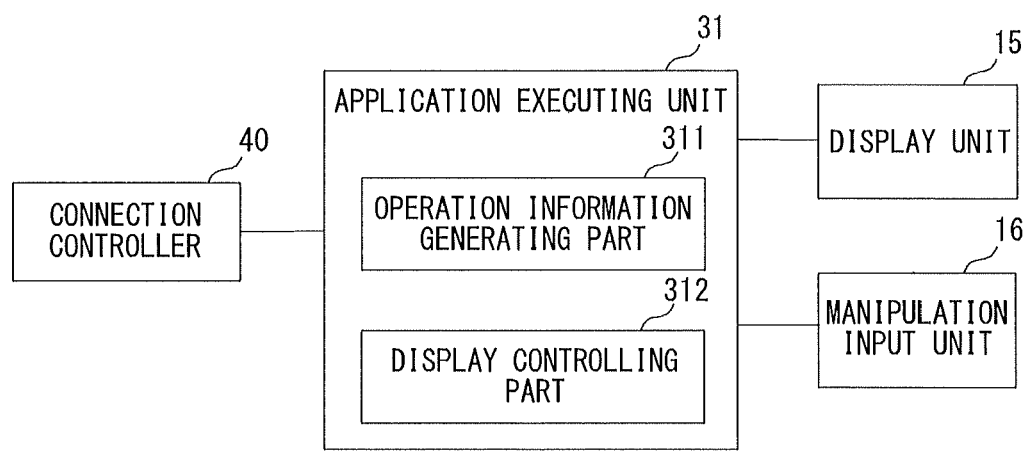
FIG. 8 shows relations among the application executing unit, a display unit, a manipulation input unit and a connection controller.

FIG. 8 shows relations among the application executing unit 31, the display unit 15, the manipulation input unit 16 and the connection controller 40.

As shown in FIG. 8, each application executing unit 31 (32, 33, 34 and 35) includes an operation information generating part 311 and a display controlling part 312. Each of the operation information generating part 311 and the display controlling part 312 sends and receives data to and from the display unit 15, the manipulation input unit 16 and the connection controller 40.

The operation information generating part 311 generates the operation information showing what operation is performed when the operation is performed through the manipulation input unit 16. The display controlling part 312 creates the screen specific to the application executing unit 31 and displays the created screen on the display unit 15. To be more specific, the display controlling part 312 of the cloud service application executing unit 32 creates the cloud service screen (see FIG. 9A) and displays the created cloud service screen on the display unit 15. On the cloud service screen thereby created, a variety of items required for data transmission with the service providing server 4 are displayed, and the inputs may be received. The display controlling part 312 of the file creation application executing unit 33 creates the list of files screen (see FIG. 9B) on which a list of the files in the folder stored on the service providing server 4 or the portable information terminal 3 is shown or the screen (not shown in figures) on which the specific opened file is shown and displays the created screen on the display unit 15. The display controlling part 312 of the shooting and play application executing unit 34 creates the screen (see FIG. 9C) on which data such as live view images or the shot images is shown and displays the created screen on the display unit 15.

Figure 9A:
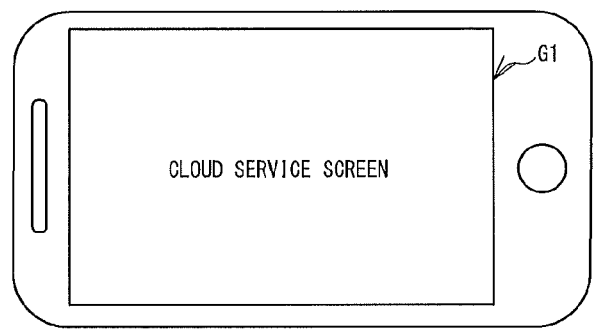
FIG. 9A is an example of a cloud service screen displayed when a cloud service application executing unit runs.
Figure 9B:
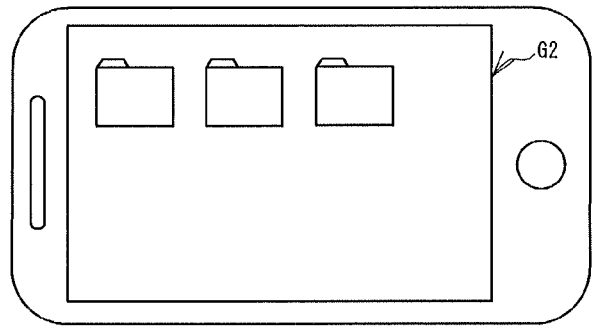
FIG. 9B is an example of a list of files screen displayed when a file creation application executing unit runs.
Figure 9C:
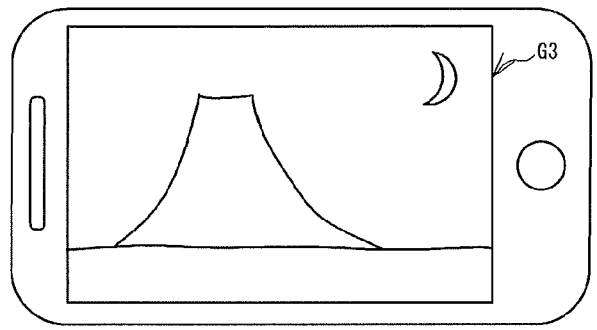
FIG. 9C is an example of a screen displayed when a shooting and play application executing unit runs.
Figure 9D:
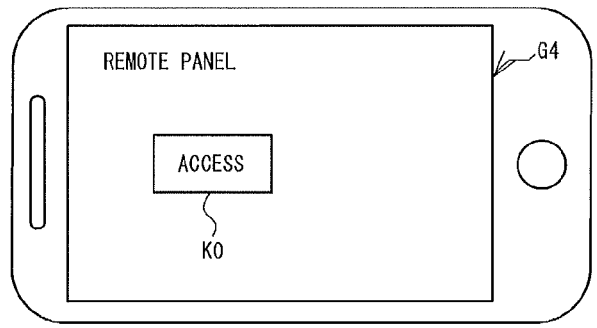
FIG. 9D is an example of an initial screen displayed when a remote control application executing unit runs.

The display controlling part 312 of the remote control application executing unit 35 displays an initial screen G4 as shown in, for instance, FIG. 9D as an initial screen. The initial screen G4 includes an "access" key K0, by pressing which the user is allowed to give an instruction to establish connection between the portable information terminal 3 and the information processing device 2 to allow communication therebetween. When the "access" key K0 is pressed, the processing to connect to the information processing device 2 by the portable information terminal 3 is started.

After connection between the portable information terminal 3 and the information processing device 2 to allow communication therebetween is established, the display controlling part 312 of the remote control application executing unit 35 displays the screen on the display unit 15, which is received from the information processing device 2. More specifically, after connection between the portable information terminal 3 and the information processing device 2 to allow communication therebetween is established, the screen the same as that displayed on the operational panel 8 of the information processing device 2 is displayed on the portable information terminal 3.

Thus, the user is allowed to use the screen he or she is familiar with or is used to using with the information processing device 2 even with the portable information terminal 3. Compared with the case when the screen different from that displayed on the operational panel 8 of the information processing device 2 is displayed on the portable information terminal 3, there is little decline in operability.

Figure 10:
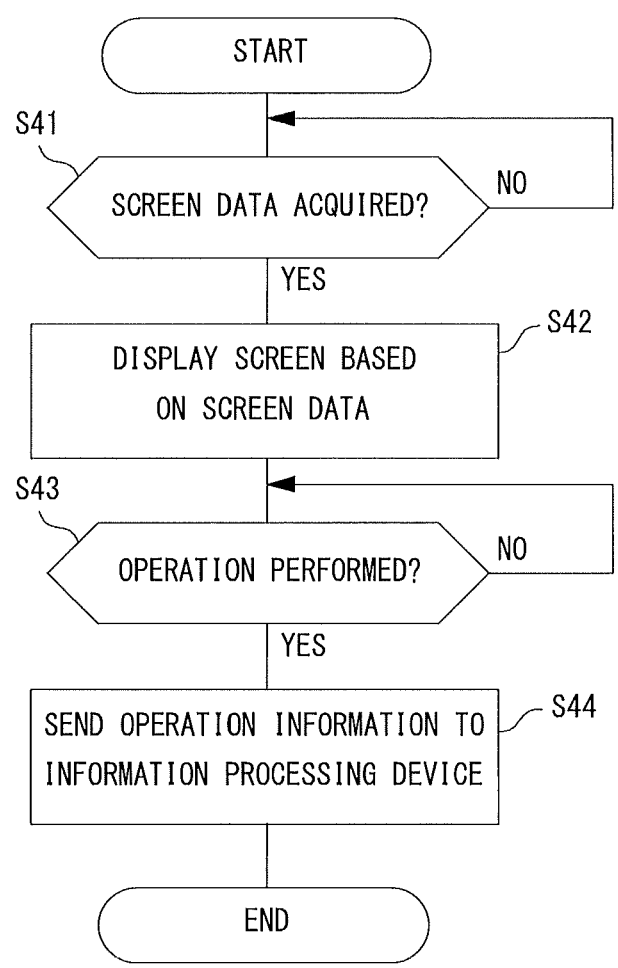
FIG. 10 is a flow diagram explaining an exemplary sequential procedure of the process performed when the remote control application executing unit receives screen data from the information processing device.

FIG. 10 is a flow diagram explaining an exemplary sequential procedure of the process performed when the remote control application executing unit 35 receives the screen data from the information processing device 2.

As shown in FIG. 10, after the remote control application executing unit 35 receives the screen data showing the operational screen from the information processing device 2 (when a result of step S41 is YES), the display controlling part 312 displays the screen on the display unit 15 based on the received screen data (step S42).

When the operation is performed on the operational screen displayed on the display unit 15 (when a result of step S43 is YES), the operation information generating part 311 generates the operation information showing what operation is performed and sends the operation information to the information processing device 2 via the information transmitting part 46 (step S44).

Figure 11:
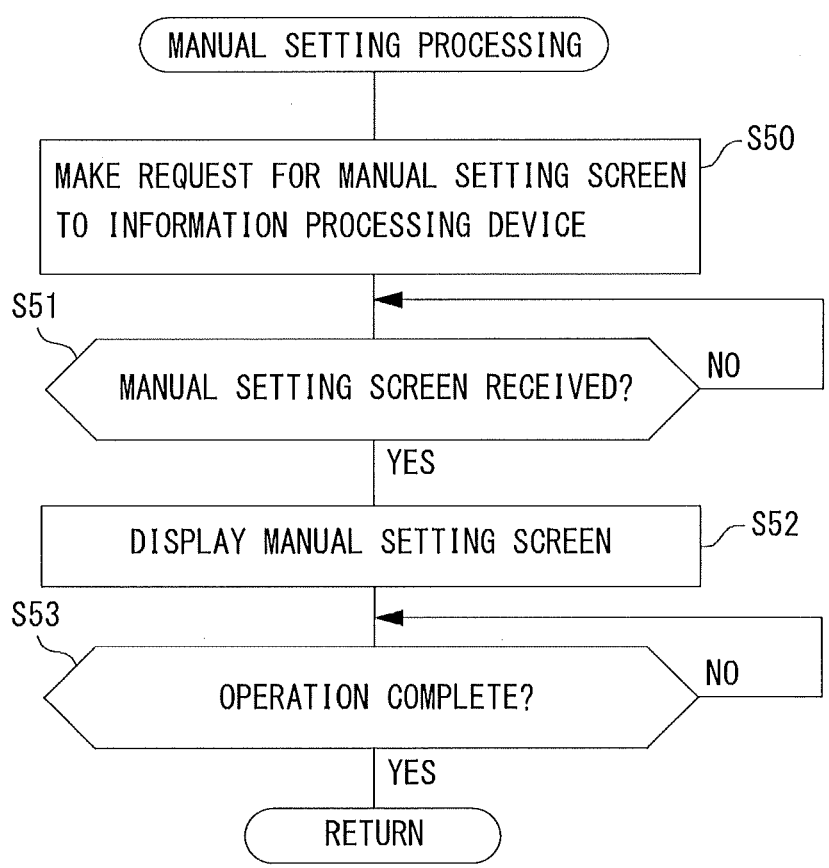
FIG. 11 is a flow diagram explaining an exemplary sequential procedure of a manual setting processing in step S34 of FIG. 7.

FIG. 11 is a flow diagram explaining an exemplary sequential procedure of the manual setting processing in step S34. As shown in FIG. 11, the display controlling part 312 of the remote control application executing unit 35 makes a request for a manual setting screen G5 to the information processing device 2 to display the manual setting screen G5 as illustrated in FIG. 12, for example (step S50).

Figure 12:
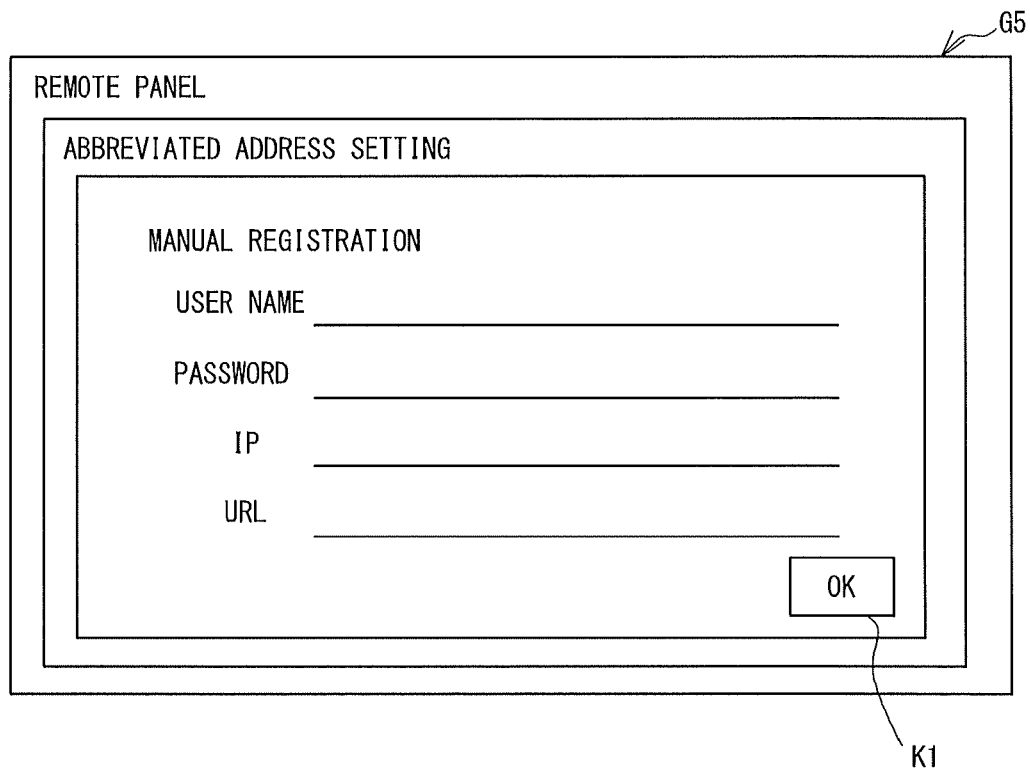
FIG. 12 is an example of a manual setting screen.

FIG. 12 shows an example of the manual setting screen G5. A user name, a password, an IP address and a URL which should be accessed by the information processing device 2 may be input on the manual setting screen G5 of FIG. 12. After an "OK" key K1 is pressed, information indicating completion of a series of operation on the manual setting screen G5 is input, and the operation information input on the manual setting screen G5 is temporarily stored in the storage unit 18 of the portable information terminal 3 until it is sent to the information processing device 2. In response to storing the operation information, the portable information terminal 3 completes displaying the manual setting screen G5.

Referring back to FIG. 11, after receiving the screen data showing the above-described manual setting screen G5 from the information processing device 2 (when a result of step S51 is YES), the display controlling part 312 displays the manual setting screen G5 (step S52). The user is then allowed to input information for each item. After the "OK" key K1 is pressed and the information indicating the completion of the operation on the manual setting screen G5 is input (when a result of step S53 is YES), the processing moves on to step S32.

Figure 13:
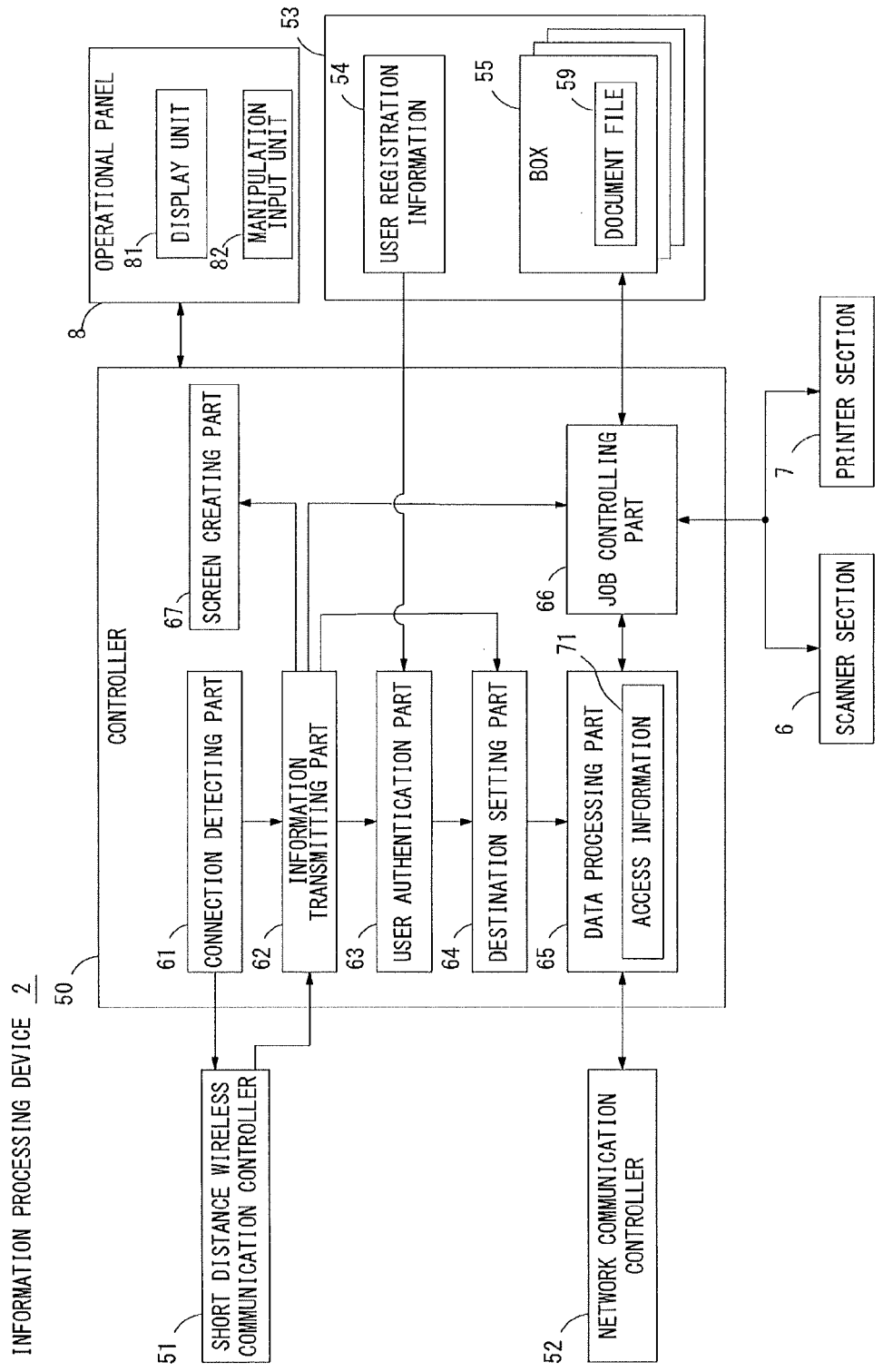
FIG. 13 is a block diagram showing an exemplary hardware configuration of the information processing device.

The information processing device 2 is described next. FIG. 13 is a block diagram showing an exemplary hardware configuration of the information processing device 2. As illustrated in FIG. 13, the information processing device 2 includes the operational panel 8, a controller 50, a short distance wireless communication controller 51, a network communication controller 52 and a storage device 53 besides the above-described scanner section 6 and printer section 7.

The operational panel 8 includes a display unit 81 and a manipulation input unit 82. The display unit 81 is formed from a device such as a color liquid crystal display, for example, and displays various types of information including a variety of screens containing operational keys to input various types of operation instructions or previews showing in advance results of printing based on the image files to the user of the information processing device 2.

The manipulation input unit 82 formed with parts such as a variety of mechanical operational keys and/or touch panel sensors arranged on the screen of the display unit 81, for example, receives inputs by the user of the information processing device 2. The variety of mechanical operational keys include, for instance, a start key to input an instruction to start execution of the scan function or the print function or a numerical keypad to input execution conditions such as the number of printed outputs to produce.

The controller 50 includes a CPU and a memory which are not shown in figures, which is the same as that of the portable information terminal 3. In response to execution of a predetermined application by the CPU, the controller 50 serves as a connection detecting part 61, an information transmitting part 62, a user authentication part 63, a destination setting part 64, a data processing part 65, a job controlling part 66 and a screen creating part 67. The controller 50 is explained in detail later.

The short distance wireless communication controller 51 controls short distance wireless communication when the communication with the portable information terminal 3 is established by the controller 50. Once the short distance wireless communication becomes available with the portable information terminal 3, the short distance wireless communication controller 51 automatically detects the connection status and notifies the controller 50.

The network communication controller 52 controls data communication when the communication is established over the network 5 by the controller 50. When connecting to the service providing server 4 over the network 5, the information processing device 2 sends and receives data via the network communication controller 52.

The storage device 53 is formed from a nonvolatile storage device such as a hard disk drive (HDD). The storage device 53 stores therein user registration information 54, for example. Information regarding the user authorized in advance to use the information processing device 2, for example, is registered as the user registration information 54. More specifically, the information that may identify the user, such as a user ID and a password is registered as the user registration information 54. This user registration information 54 is not necessarily stored in the storage device 53, and it may be stored in another device such as another server. The storage device 53 includes at least one BOX 55 as a storage region to store therein data such as document data 59. The BOX 55 is the storage region to store therein a variety of data when the user selects box function.

Each processing part put into operation to function on the controller 50 is described next. The connection detecting part 61 is resident in the controller 50 while the information processing device 2 is being powered on. The connection detecting part 61 detects establishment of the connection with the portable information terminal 3 allowing the short distance wireless communication therebetween via the short distance wireless communication controller 51. In response to detection of the establishment of the connection with the portable information terminal 3 by the connection detecting part 61, the information transmitting part 62, the user authentication part 63 and the destination setting part 64 are put into operation to function in series.

The information transmitting part 62 sends and receives the variety of information to and from the portable information terminal 3 through the short distance wireless communication. As described above, the portable information terminal 3 sends the access information, the authentication information 23 (see FIG. 2) and the user information 24 (see FIG. 2) to the information processing device 2 when the short distance wireless communication becomes available with the information processing device 2. The information transmitting part 62 receives the information and sorts the information to separate the access information, the authentication information 23 and the user information 24. Also, the information transmitting part 62 sends the screen data showing the operational screen created by the screen creating part 67 described later to the portable information terminal 3.

The user authentication part 63 acquires only the user information 24 which is separated by the information transmitting part 62 and performs user authentication of the user using the portable information terminal 3. To be more specific, the user authentication part 63 reads the user registration information 54 from the storage device 53 and determines whether or not any information registered as the user registration information 54 matches the user information 24, thereby performing user authentication. If the user authentication results in success, the user authentication part 63 puts the information processing device 2 into a logged-in state in which the user using the portable information terminal 3 is logging in. As a result, the user using the portable information terminal 3 is allowed to make the information processing device 2 perform a variety of jobs. The user authentication part 63 then puts the destination setting part 64 into operation to function when the user authentication results in success.

The destination setting part 64 acquires the access information and the authentication information 23 separated by the information transmitting part 62. The destination setting part 64 outputs the information to the data processing part 65, thereby configuring in advance with the data processing part 65 the destination to access the service providing server 4 the same as that accessed by the application executing unit 31 on the portable information terminal 3.

The data processing part 65 establishes network communication via the network communication controller 52. The data processing part 65 sends and receives data to and from an external device over the network 5. After the information processing device 2 is put into the logged-in state, the data processing part 65 configures in advance the target (destination) to access over the network 5 based on access information 71 received from the destination setting part 64. The data processing part 65 rewrites the default value as to the destination for the network communication configured in advance, for example, to the access information 71 received from the destination setting part 64. Also, the data processing part 65 saves the authentication information 23 received from the destination setting part 64.

The data processing part 65 is configured to send the saved authentication information 23 to the destination at the same time or almost same time on the access to the destination based on the access information 71. The data processing part 65 is allowed to automatically access the cloud service same as that accessed by the application executing unit 31 running on the portable information terminal 3 and automatically log-in to the user's account at the start of the network communication.

The job controlling part 66 is put into operation to function after the information processing device 2 is put into the logged-in state. The job controlling part 66 controls execution of a job specified by the user in response to the user's instruction given through the operational panel 8 or the portable information terminal 3, for example, as described later. The job controlling part 66 drives the scanner section 6 to read the document and generate the scan image file or the printer section 7 to produce the printed output by outputting the image data to the printer section 7.

The job controlling part 66 stores the document file 59 in the BOX 55 or read the document file 59 stored in the BOX 55. The job controlling part 66 outputs the data such as the image data to the data processing part 65, thereby sending the data to the external device over the network 5, or gives the instruction to acquire the data such as the image data to the data processing part 65 to acquire the data from the external device over the network 5.

Figure 14:
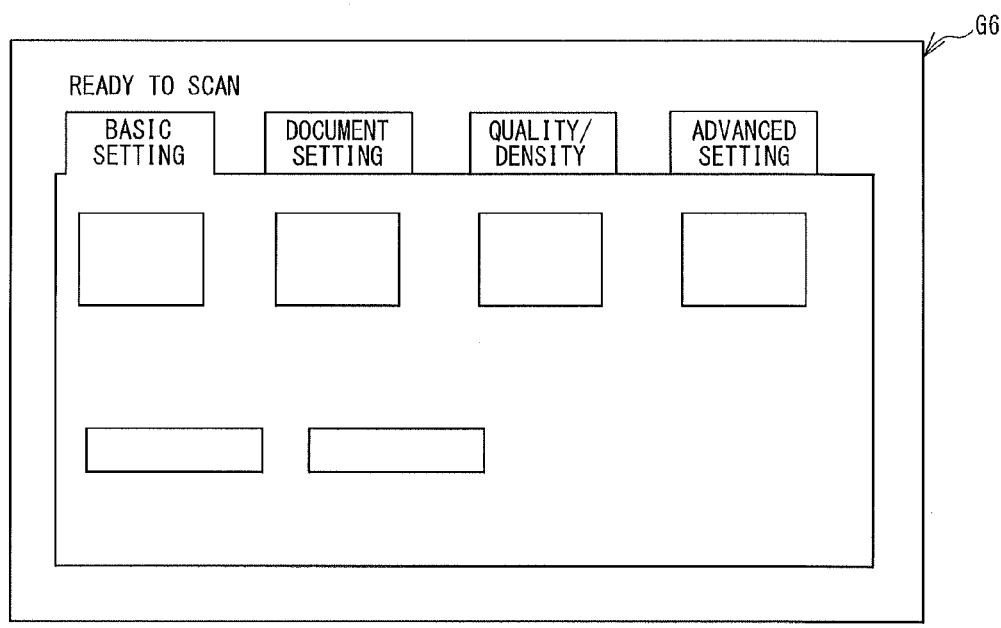
FIG. 14 is an example of a screen usually displayed on a display unit when the short distance radio communication between the information processing device and the portable information terminal is not available.

The screen creating part 67 creates the screen to display on the display unit 81 of the operational panel 8 and the display unit 15 of the portable information terminal 3. When the information processing device 2 is not connected to the portable information terminal 3 to allow the short distance radio communication therebetween, the screen creating part 67 creates the usual screen as shown in FIG. 14, for instance, and makes only the display unit 81 display the created screen.

After connection between the information processing device 2 and the portable information terminal 3 to allow the short distance radio communication therebetween is established, the information processing device 2 may receive the access information 71 from the portable information terminal 3. In response to receiving the access information 71, the screen creating part 67 newly creates the screen as to the location to access (destination) shown by the access information 71.

Figure 15:
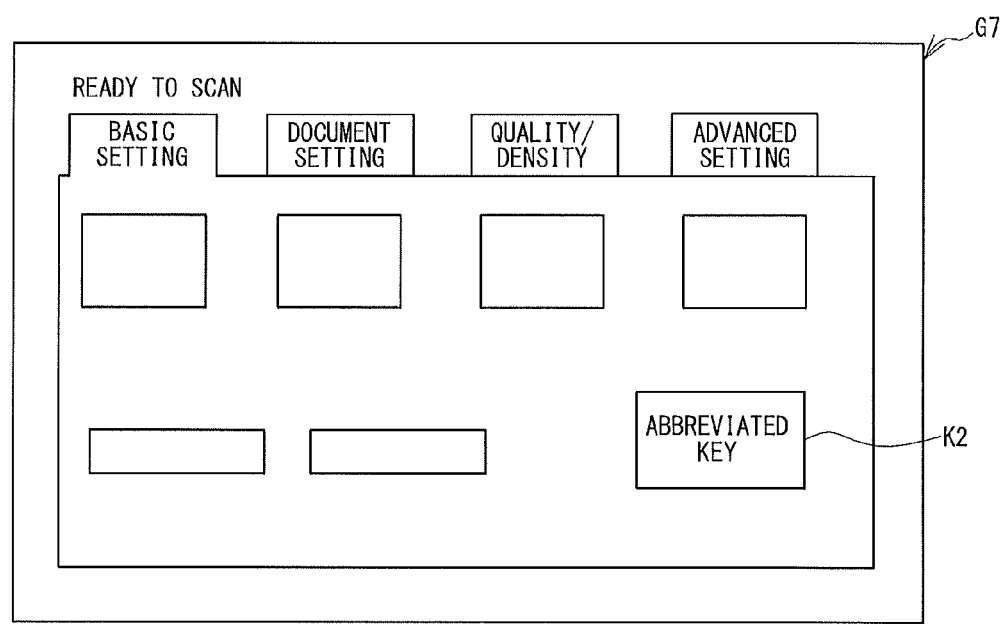
FIG. 15 is an example of a screen created when access information shows a destination to access is a cloud service.

When the destination shown by the access information 71 is the service providing server 4, the screen creating part 67, for example, newly creates the screen by adding an abbreviated key (short cut key) K2 to the screen displayed on the operational panel 8 until just before receiving the access information 71 as the new screen (see FIG. 15). By pressing the abbreviated key K2, the user is allowed to give instruction to establish direct communication between the service providing server 4 and the information processing device 2.

Similarly, when the destination shown by the access information 71 is the folder opened by the file creation application executing unit 33, the screen creating part 67, for example, newly creates the screen by adding an abbreviated key to the screen displayed on the operational panel 8 until just before receiving the access information 71 as the new screen. By pressing the abbreviated key, the user is allowed to give instruction to make the information processing device 2 directly access the folder.

The destination shown by the access information 71 may be the document file or the image file opened by the file creation application executing unit 33 or the shooting and play application executing unit 34. In this case, after the information processing device 2 accesses the aforementioned file and acquires the file, the screen creating part 67 newly creates the screen by adding a preview PV and an abbreviated key K3 to the screen displayed on the operational panel 8 until just before receiving the access information 71 as the new screen (see FIG. 16). In the preview PV area, the preview of the document or the shot image based on the file is shown, and by pressing the abbreviated key K3, the user is allowed to give instruction to produce the printed output based on the document or the shot image.

Figure 17:
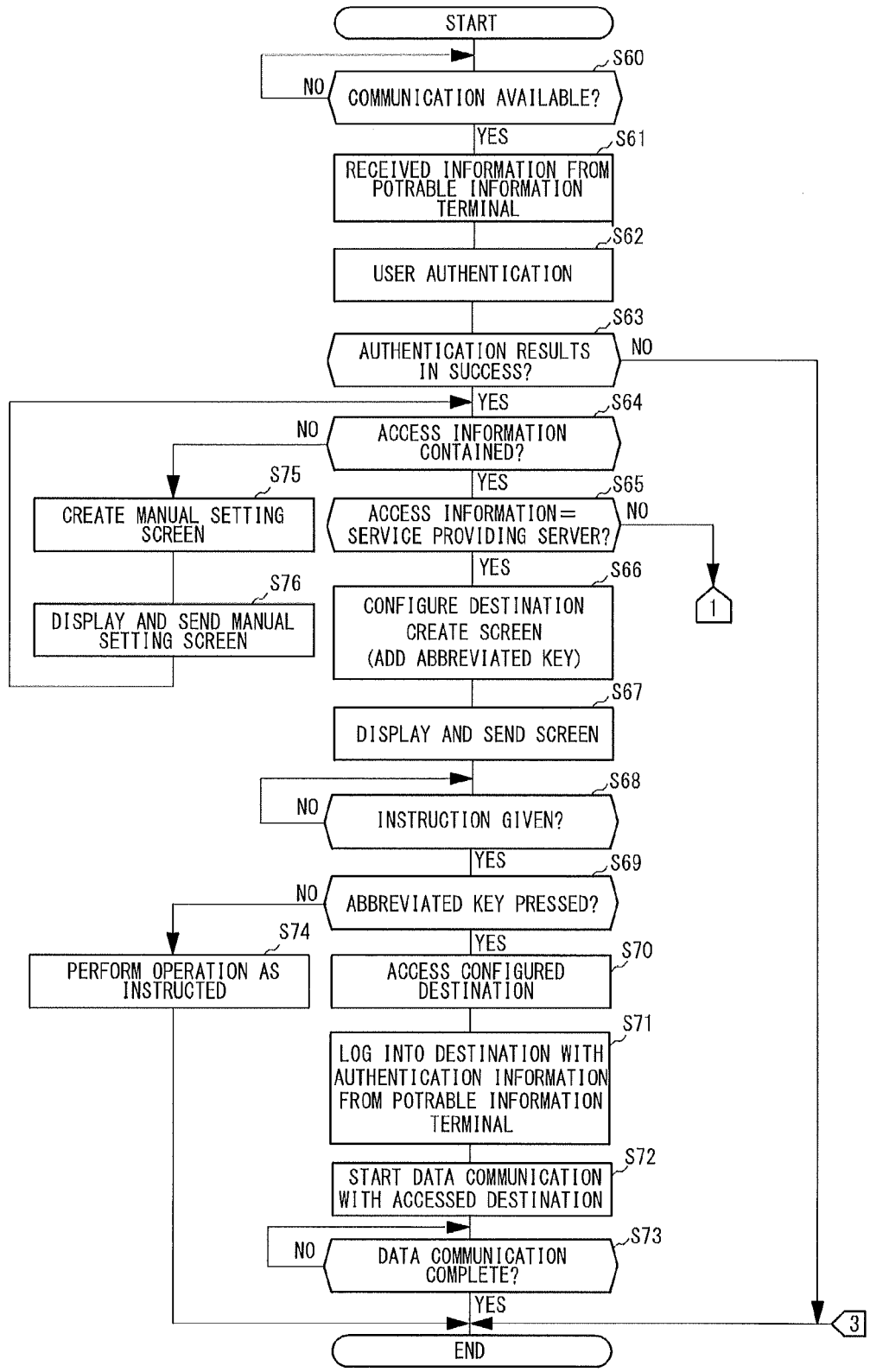
FIG. 17 is a flow diagram explaining exemplary sequential procedures of the process performed on the information processing device.
Figure 18:
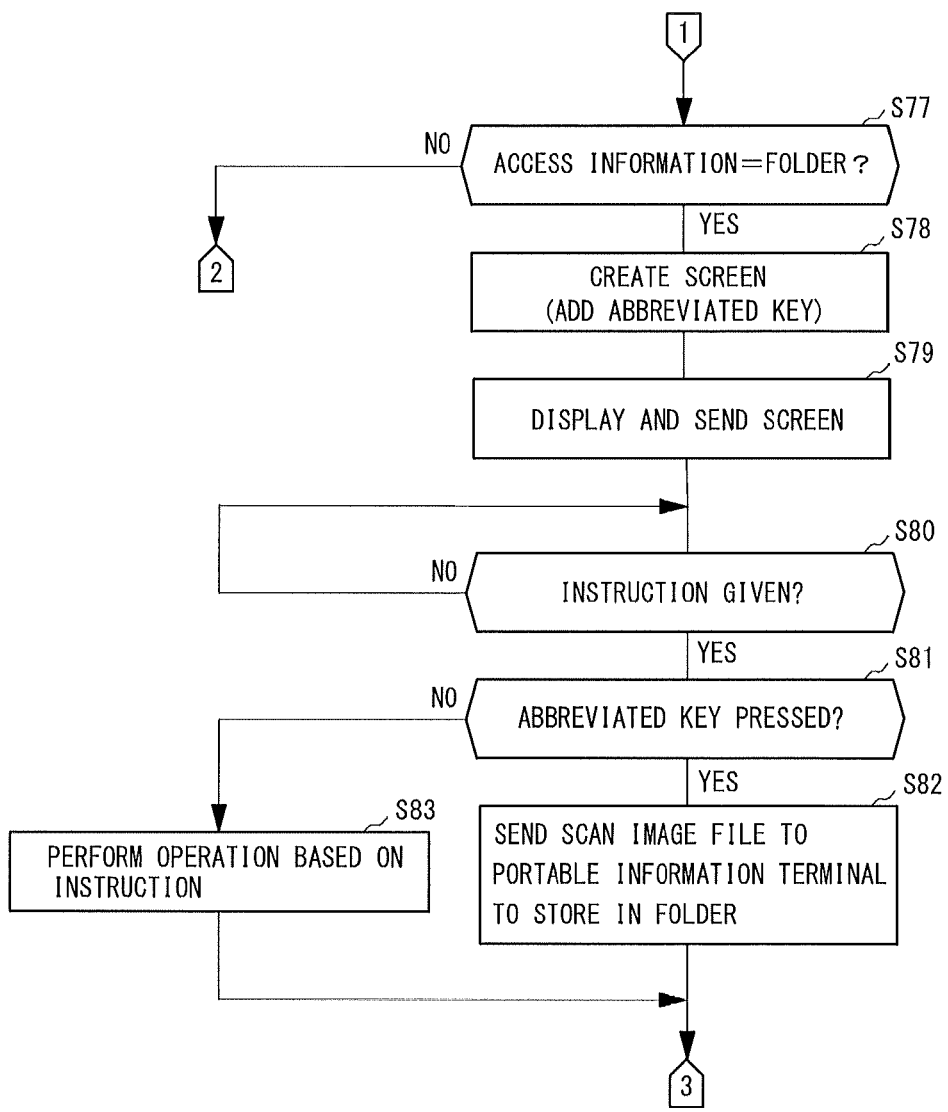
FIG. 18 is a flow diagram explaining exemplary sequential procedures of the process performed on the information processing device.
Figure 19:
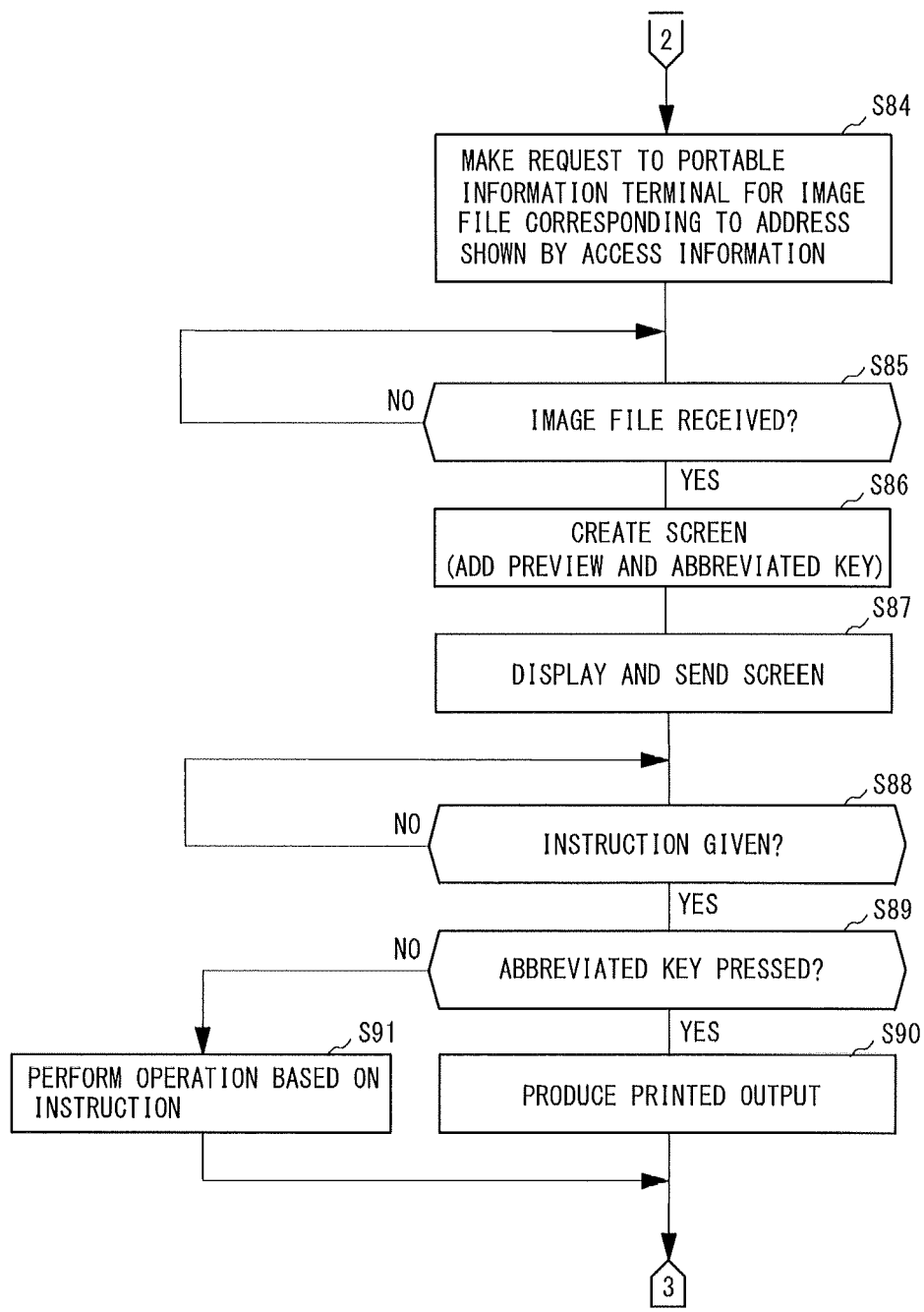
FIG. 19 is a flow diagram explaining exemplary sequential procedures of the process performed on the information processing device.

FIGS. 17 to 19 are flow diagrams explaining exemplary sequential procedures of the process performed on the information processing device 2. The information processing device 2 constantly monitors whether or not the short distance wireless communication with the portable information terminal 3 becomes available (step S60). When the short distance wireless communication with the portable information terminal 3 becomes available (when a result of step S60 is YES), the information processing device 2 receives the information from the portable information terminal 3 (step S61). The information thereby received contains at least the user information 24. The information processing device 2 cross-checks the user information 24 with the user registration information 54, thereby performing user authentication (step S62). The information processing device 2 then determines whether or not the user authentication results in success (step S63). If the user authentication results in failure (when a result of step S63 is NO), the information processing device 2 completes the process without entering the logged-in state.

If the user authentication results in success (when a result of step S63 is YES), the information processing device 2 puts its operation state into the logged-in state. The information processing device 2 then determines whether or not the access information 71 is contained in the information received from the portable information terminal 3 (step S64). With the access information 71 contained (when a result of step S64 is YES), the information processing device 2 determines if the destination shown by the access information 71 is the service providing server 4 (step S65).

After determining that the destination is the service providing server 4 (when a result of step S65 is YES), the information processing device 2 configures the destination to access for the network communication based on the access information 71 and creates the screen G7 including the abbreviated key K2 as illustrated in FIG. 15 (step S66). The information processing device 2 displays the created screen G7 on the operational panel 8 and sends the screen data of the screen G7 to the portable information terminal 3 (step S67).

After detecting the instruction given by the logged-in user (when a result of step S68 is YES), the information processing device 2 determines whether or not the instruction is given by pressing the abbreviated key K2 (step S69). When the instruction is not given by pressing the abbreviated key K2 (when a result of step S69 is NO), the information processing device 2 performs the predetermined operation corresponding to the instruction (step S74).

When the instruction detected in step S68 is given by pressing the abbreviated key K2 (when a result of step S69 is YES), the information processing device 2 accesses the destination which is configured in advance over the network 5 (step S70). The information processing device 2 logs in to the destination using the saved authentication information 23 which is received together with the access information 71 from the portable information terminal 3 (step S71).

More specifically, the information processing device 2 logs in to the service providing server 4 the same as that accessed by the cloud service application executing unit 32 running on the portable information terminal 3 with which the short distance wireless communication is available. The user is not required to input the access information 71 or the authentication information 23 to the information processing device 2 by manual so that the operability of the information processing device 2 improves.

After logging into the service providing server 4, the information processing device 2 starts the data communication with the service providing server 4 which is the destination to access in response to the logged-in user's instruction (step S72). More specifically, the information processing device 2 starts data communication to upload the file (data) to the service providing server 4 and/or to download the file (data) in the service providing server 4 in response to the logged-in user's instruction. The information processing device 2 executes the job specified by the logged-in user by activating functions such as scan or print function in response to the logged-in user's instruction. After completion of the data communication (when a result of step S73 is YES), the information processing device 2 returns its operation state to the logged-out state from the logged-in state in response to the logged-in user's instruction and completes the process.

When the user authentication results in success and the information received from the portable information terminal 3 at entering the logged-in state does not contain the access information 71 (when a result of step S64 is NO), the information processing device 2 creates the manual setting screen G5 as illustrated in FIG. 12 (step S75). The information processing device 2 displays the created manual setting screen G5 on the operational panel 8 and sends the screen data of the manual setting screen G5 to the portable information terminal 3 (step S76). The information processing device 2 then returns the process in step S64. When the logged-in user would like to make the information processing device 2 access the service providing server 4, he or she is required to input the information including the access information 71 to the information processing device 2 by making manual operation on the operational panel 8 or the portable information terminal 3, for example.

The information processing device 2 determines in step S65 that the destination shown by the access information 71 may not be the service providing server 4 (when a result of step S65 is NO). In this case, the destination shown by the access information 71 may be the address of the folder (when a result of step S77 is YES). The information processing device 2 then creates the screen including the abbreviated key based on the access information 71 (step S78). The information processing device 2 displays the created screen on the operational panel 8 and sends the screen data of the screen to the portable information terminal 3 (step S79).

After detecting the instruction given by the logged-in user (when a result of step S80 is YES), the information processing device 2 determines whether or not the instruction is given by pressing the abbreviated key (step S81). When the instruction is not given by pressing the abbreviated key (when a result of step S81 is NO), the information processing device 2 performs the operation based on the instruction (step S83).

When the instruction detected in step S80 is given by pressing the abbreviated key (when a result of step S81 is YES), the information processing device 2 sends the predetermined file (in this case, scan image file) to the portable information terminal 3 to store the file in the folder (step S82). The information processing device 2 then returns its operation state to the logged-out state from the logged-in state in response to the logged-in user's instruction and completes the process.

The information processing device 2 determines in step S77 that the destination shown by the access information 71 may not be the address of the folder. In this case, the destination shown by the access information 71 may be the address of the image file showing the shot image (when a result of step S77 is NO). The information processing device 2 then makes a request to the portable information terminal 3 for the image file corresponding to the address shown by the access information 71 (step S84).

Figure 16:
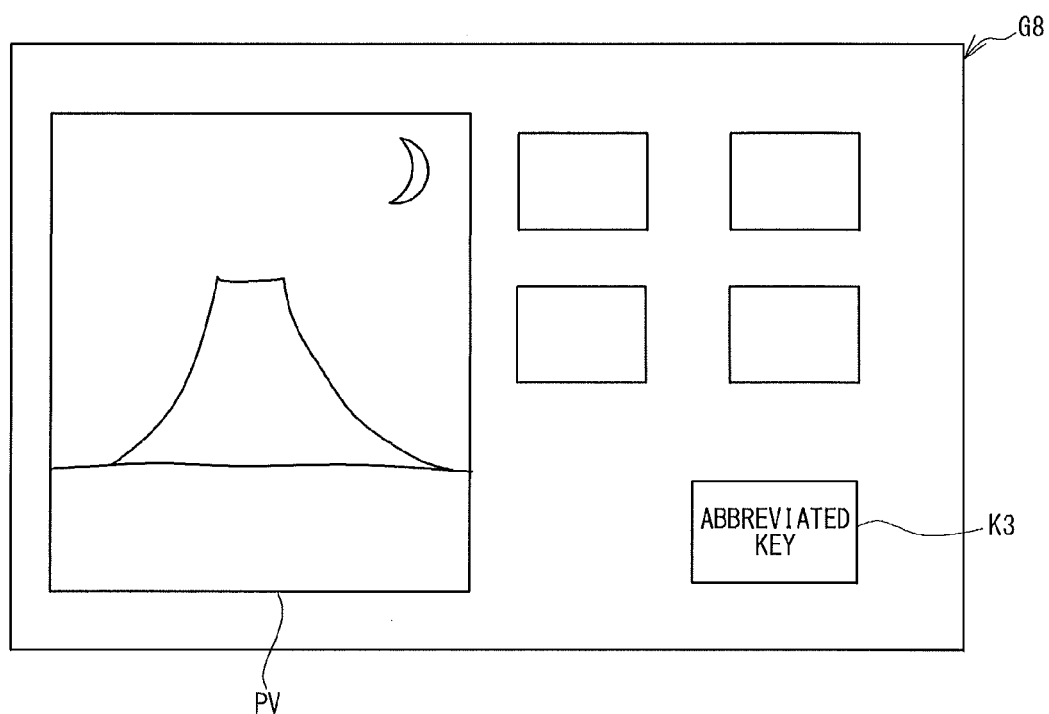
FIG. 16 is an example of a screen created when the access information shows the destination to access is an address of a shot image.

In response to receiving the image file as requested from the portable information terminal 3 (step S85), the information processing device 2 creates a screen G8 including the preview PV in which the preview of the shot image is shown and the abbreviated key K3 as illustrated in FIG. 16, for instance (step S86). The information processing device 2 displays the created screen G8 on the operational panel 8 and sends the screen data of the screen G8 to the portable information terminal 3 (step S87).

After detecting the instruction given by the logged-in user (when a result of step S88 is YES), the information processing device 2 determines whether or not the instruction is given by pressing the abbreviated key K3 (step S89). When the instruction is not given by pressing the abbreviated key K3 (when a result of step S89 is NO), the information processing device 2 performs the operation based on the instruction (step S91).

When the instruction detected in step S88 is given by pressing the abbreviated key K3 (when a result of step S89 is YES), the information processing device 2 produces the printed output based on the received image file showing the shot image (step S90).

As described above, on the information processing system 1, after the remote control application executing unit 35 is run, the portable information terminal 3 identifies the application executing unit 31 which is running at this time besides the remote control application executing unit 35. When the application executing unit 31 thereby identified is the cloud service application executing unit 32, the portable information terminal 3 generates the access information 71 showing the destination of the service providing server 4 accessed by the cloud service application executing unit 32 and sends the generated access information 71 to the information processing device 2.

The information processing device 2 creates the screen G7 (see FIG. 15) including the abbreviated key K2, by pressing which the user is allowed to give instruction to establish communication between the service providing server 4 which is the destination shown by the access information 71 and the information processing device 2 based on the access information 71 received from the portable information terminal 3. The information processing device 2 sends the screen data of the screen G7 to the portable information terminal 3. In response to receiving the operation information showing that the abbreviated key K2 is pressed from the portable information terminal 3, the information processing device 2 accesses the service providing server 4 over the network 5 based on the destination shown by the access information 71, thereby sending and receiving data (file) to and from the service providing server 4.

According to the present preferred embodiment, it is not necessary to register in advance the information such as that as to the cloud service used by each user with the information processing device 2. To be more specific, when each user would like to make the information processing device 2 directly access the service providing server 4 to send and receive data (file) directly to and from the service providing server 4, he or she just starts the cloud service application executing unit 32 to access the service providing server 4 up on the portable information terminal 3 which is normally used by him or her and causes the portable information terminal 3 to establish communication with the information processing device 2 by pressing the abbreviated key K2 displayed on the portable information terminal 3.

Thus, in the present preferred embodiment, the user is allowed to make the information processing device 2 directly send and receive data to and from the service providing server 4 by simply pressing the abbreviated key K2. Therefore, the operability of the user to cause the information processing device 2 to directly access the service providing server 4 is improved.

The application executing unit 31 running when the remote control application executing unit 35 is run may be the file creation application executing unit 33. In this case, if the folder is opened by the file creation application executing unit 33, the portable information terminal 3 generates the address of the folder as the access information 71 and sends the generated access information 71 to the information processing device 2.

The information processing device 2 creates the screen including the abbreviated key, by pressing which the user is allowed to give instruction to send the file (for instance, scan image file) to the folder which is the destination shown by the access information 71 based on the access information 71 received from the portable information terminal 3. The information processing device 2 sends the created screen to the portable information terminal 3. In response to receiving the operation information showing that the abbreviated key is pressed from the portable information terminal 3, the information processing device 2 accesses the folder, thereby sending the file to the folder.

As a result, it is not necessary to register in advance the information such as the access information of the folder which is the destination to save the file with the information processing device 2. More specifically, the user may want to send and store the file such as the scan image file generated with the information processing device 2 to the intended folder in the portable information terminal 3. In this case, the user is just required to start the file creation application executing unit 33 on the portable information terminal 3 which is normally used by him or her and causes the portable information terminal 3 to send and receive the file to and from the information processing device 2 by pressing the abbreviated key displayed on the portable information terminal 3.

Thus, in the present preferred embodiment, the user is allowed to give instruction to send the file saved in the information processing device 2 to the intended folder in the portable information terminal 3 by simply pressing the abbreviated key. Therefore, the user is not necessary to repeatedly input information like specifying the destination to send the file (specifying the intended folder) which is already input with the file creation application executing unit 33. The operability of the user to send and store the file saved in the information processing device 2 to the intended folder in the portable information terminal 3 is improved.

The application executing unit 31 running when the remote control application executing unit 35 is run may be the shooting and play application executing unit 34. In this case, the portable information terminal 3 generates the address of the image file played by the shooting and play application executing unit 34 as the access information 71 and sends the generated access information 71 to the information processing device 2.

The information processing device 2 accesses the destination shown by the access information 71 received from the portable information terminal 3 and acquires the image file. The information processing device 2 then creates the screen G8 (see FIG. 16) including the preview PV area, in which the preview based on the image file is shown, and the abbreviated key K3, by pressing which the user is allowed to give instruction to produce the printed output based on the image file. The information processing device 2 sends the created screen G8 to the portable information terminal 3. In response to receiving the operation information showing that the abbreviated key K3 is pressed from the portable information terminal 3, the information processing device 2 produces the printed output based on the image file.

As a result, it is not necessary to configure in advance the information processing device 2 as the destination to send the image file of the shot image based on which the user would like to produce the printed output. More specifically, the user may want to make the information processing device 2 produce the printed output based on the image shot with the portable information terminal 3. In this case, the user is just required to start the shooting and play application executing unit 34 on the portable information terminal 3 which is normally used by him or her and causes the portable information terminal 3 to establish communication with the information processing device 2 by pressing the abbreviated key K3 displayed on the portable information terminal 3.

Thus, in the present preferred embodiment, the user is allowed to give instruction to produce the printed output based on the image shot with the portable information terminal 3 to the information processing device 2 by simply pressing the abbreviated key K3. Therefore, the user is not necessary to repeatedly input information like specifying the image file based on which the printed output to be produced which is already input with the shooting and play application executing unit 34. The operability of the user to make the information processing device 2 produce the printed output based on the image shot with the portable information terminal 3 is improved.

As described above, operability for making the information processing device access the destination such as the cloud service or the specific folder used by the user is improved. Also, direct data receipt and transmission to and from the destination may be realized without complicated manual operations.

MODIFICATIONS

While the preferred embodiment of the present invention has been described above, the present invention is not limited to the preferred embodiment. Various modifications may be applied to the present invention.

(1) In the present preferred embodiment described above, after receiving the new screen created by the information processing device 2, the portable information terminal 3 switches the screen from the previous one (previous screen) displayed until then to the new one (new screen). The portable information terminal 3 may display both previous and new screens at the same time by placing the screens side-by-side.

Figure 20:
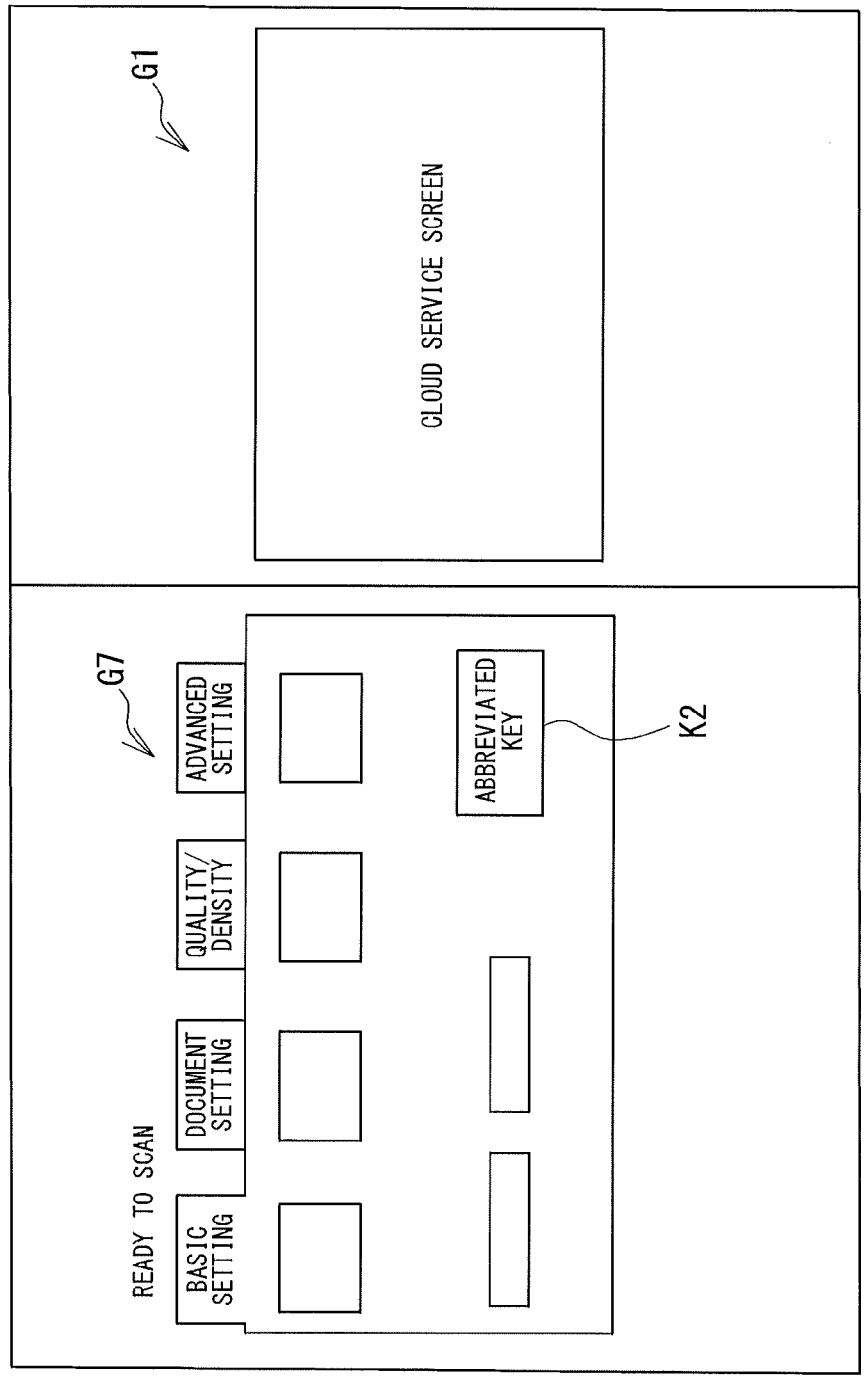
FIG. 20 is an example of a parallel display screen displayed on the portable information terminal when the remote control application executing unit is run while the cloud service application executing unit is running.

FIG. 20 is an example of the parallel display screen. The screen is displayed on the portable information terminal 3 when the remote control application executing unit 35 is run as the cloud service application executing unit 32 is running.

The screen of FIG. 20 includes the screen G7 of FIG. 15 and the screen G1 of FIG. 9A placed side-by-side.

By viewing such a screen showing two screens at the same time, the user is allowed to input information without switching the screens among pervious and new screens when he or she would like to operates both pervious and new screens, resulting in enhanced user operability. This processing to display two screens at the same time may be performed by the display controlling part 312 of the remote control application executing unit 35, for instance.

(2) According to the above-described present preferred embodiment, the remote control application executing unit 35 may run as the shooting and play application executing unit 34 is running on the portable information terminal 3 and the shot image is being displayed on the portable information terminal 3. Then, the shot image is displayed on the operational panel 8 and the portable information terminal 3 as the preview. However, when, for example, the file (data) stored in the service providing server 4 is opened by the file creation application executing unit 33, the processing to display the preview of the data in the same manner as the preview of the shot image may be performed. Also, when the specific file (data) in the certain folder is opened by the file creation application executing unit 33, the processing to display the preview of the file in the same manner as the preview of the shot image may be performed. The application executing unit 31 responsible for opening the file (data) stored in the service providing server 4 is not necessarily the file creation application executing unit 33. The cloud service application executing unit 32 may open the file instead of the file creation application executing unit 33.

As described above, some kind of file not just the image file of the shot image is opened and the remote control application executing unit 35 is running, for example. In such a case, it is assumed that the user is considering having the information processing device 2 producing the printed output. With the preview of the file being displayed as described above, the user is allowed to check the output of the printing before producing the printed output based on the opened file, resulting in improvement of user-friendliness of the information processing device 2.

(3) Direct data transmission between the information processing device 2 and the cloud service may be restricted for the security reason, for instance. In this case, the information processing device 2 may notify the portable information terminal 3 of the restriction. In response to receiving the notification from the information processing device 2, the portable information terminal 3 may start relaying the data sent and received between the information processing device 2 and the service providing server 4.

When, for example, the portable information terminal 3 should relay the data (file) from the information processing device 2 to the service providing server 4, direct data transmission between the information processing device 2 and the service providing server 4 may be restricted. In this case, the information processing device 2 notifies the portable information terminal 3 of the restriction. In order to receive the data the information processing device 2 is trying to send from the information processing device 2 and relay the data to the service providing server 4 on behalf of the information processing device 2, the portable information terminal 3 sends the information processing device 2 the access information (address of the portable information terminal 3) to access the portable information terminal 3 by the information processing device 2 in response to receiving the notification as to the restriction on direct communication from the information processing device 2. The information processing device 2 then sends the data to the address of the portable information terminal 3 shown by the access information. After receiving the data from the information processing device 2, the portable information terminal 3 relays the data to the service providing server 4.

As described above, even when direct communication between the information processing device 2 and the service providing server 4 is restricted, situation where the data cannot be sent to the service providing server 4 from the information processing device 2 may be avoided.

(4) After the operation specified by pressing the abbreviated key K2 or K3 is complete, the abbreviated key K2 or K3 displayed on the operational panel 8 and the portable information terminal 3 may be automatically deleted from the screen. Also, the abbreviated key K2 or K3 may be left.

The authentication information 23 required for using the cloud service may be registered by associating the authentication information 23 with the corresponding abbreviated key. When the cloud service is used again, the authentication information 23 associated with the corresponding abbreviated key may be used for access to the service providing server 4. In this case, the processing to send the authentication information 23 from the portable information terminal 3 to the information processing device 2 is not required so that the time the information processing device 2 takes to access the service providing server 4 and log into the user-specific account may be reduced.

Figure 21:
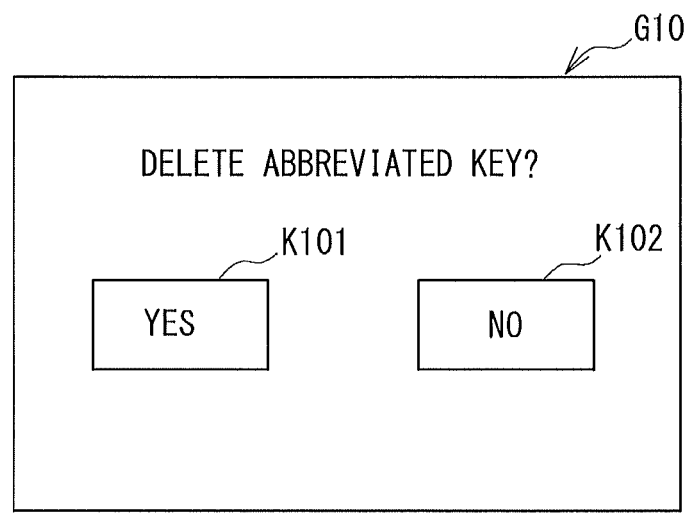
FIG. 21 is an example of a screen to make a user choose whether or not to delete an abbreviated key displayed on an operational panel or the portable information terminal from the screen after an operation specified by the user by pressing the abbreviated key is complete.

It may be allowed to have the user choosing whether or not to delete the abbreviated key displayed on the operational panel 8 and the portable information terminal 3 after the operation specified by pressing the abbreviated key is complete. FIG. 21 is an example of the screen to make the user choose.

The screen G10 of FIG. 21 includes a "YES" key 101, by pressing which the user is allowed to give an instruction to delete the abbreviated key displayed on the operational panel 8 and the portable information terminal 3 from the screen after completion of the operation and a "NO" key 102, by pressing which the user is allowed to give an instruction not to delete. The screen G10 is preferably displayed both on the operational panel 8 and the portable information terminal 3.

Figure 22:
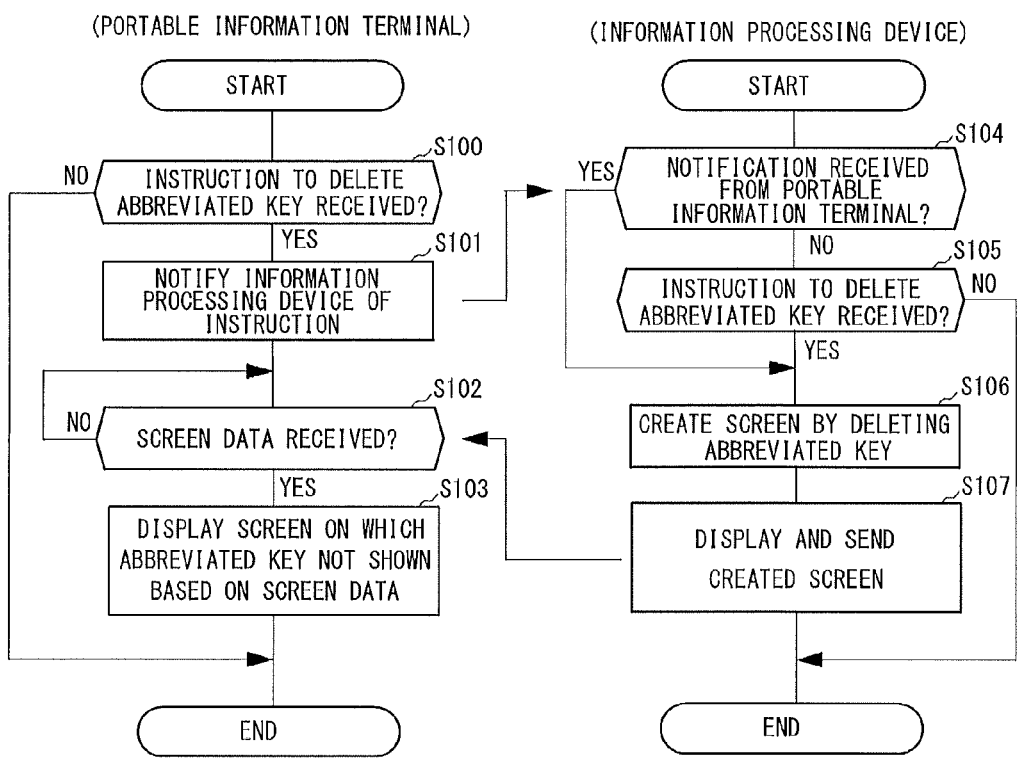
FIG. 22 is a flow diagram explaining an exemplary sequential procedure of the process performed on the portable information terminal and the information processing device when a "YES" key or a "NO" key is pressed on the screen of FIG. 21.

FIG. 22 is a flow diagram explaining an exemplary sequential procedure of the process performed on the portable information terminal 3 and the information processing device 2 when the "YES" key 101 or the "NO" key 102 is pressed on the screen G10.

As shown in FIG. 22, in response to receiving the instruction to delete the abbreviated key after the "YES" key 101 is pressed (when a result of step S100 is YES), the portable information terminal 3 notifies the information processing device 2 of the deletion (step S101).

In response to receiving the notification from the portable information terminal 3 (when a result of step S104 is YES), the screen creating part 67 of the information processing device 2 newly creates the screen by deleting the abbreviated key from the screen (step S106). The screen creating part 67 then displays the newly created screen on the operational panel 8 and sends the screen data of the screen to the portable information terminal 3 (step S107).

After receiving the screen data of the newly created screen from the information processing device 2 (when a result of step S102 is YES), the portable information terminal 3 displays the screen on which the abbreviated key is not shown based on the screen data (step S103).

The information processing device 2 does not receive from the portable information terminal 3 in step S104 the notification that the instruction to delete the abbreviated key is given (when a result of step S104 is NO) but may receive the instruction to delete the abbreviated key after the "YES" key 101 displayed on the operational panel 8 is pressed (when a result of step S105 is NO). In this case, the processing in step S106 and 107 is also performed.

When the instruction not to delete the abbreviated key is given after the "NO" key 102 is pressed in step S100 or S105 (when a result of step S100 or S105 is NO), the processing shown in FIG. 22 is complete.

With the above-described processing, the user is allowed to decide whether or not to delete the abbreviated key by considering the balance of the frequency of using the cloud service, for instance, and a user-friendliness of the screen displayed on the operational panel 8 or the portable information terminal 3.

To be more specific, if the abbreviated key is added, it has an increased number of the operational key displayed on the screen compared to the screen before adding the key. As a result, the screen becomes a bit complicated and it is not easily viewable for the user. If the user would like to easily view the screen, the added abbreviated key is preferably deleted after the use. However, if the abbreviated key corresponds to the highly used cloud service, for instance, it is preferably left on the screen in terms of user-friendliness.

As described above, by letting the user choose whether or not to delete the abbreviated key, the user-friendliness of the information processing system 1 may be improved.

(6) According to the present preferred embodiment, when no application executing unit 31 other than the remote control application executing unit 35 is running, the manual setting screen G3 as illustrated in FIG. 12 is displayed to let the user input the information as to the destination to access by the information processing device 2. The information processing system 1 may have a mode to allow the user to choose whether to configure the destination to access by him/herself or to make the information processing system 1 automatically configure the destination. FIGS. 23A to 23H are examples of the screen to let the user choose. Each of the screens of FIGS. 23A to 23H is preferably displayed on both the information processing device 2 and the portable information terminal 3.

Figure 23A:
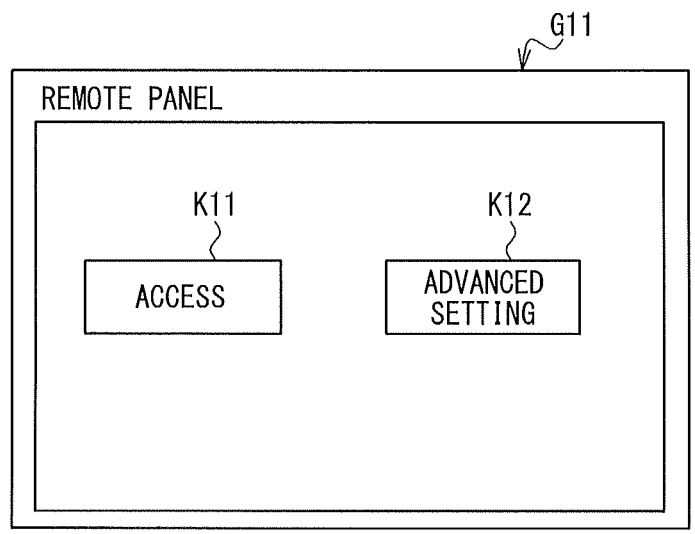
FIGS. 23A to 23H are examples of screens to make the user choose whether to configure in advance the destination to access by him/herself or to make the information processing system automatically configure the destination.

FIG. 23A is an initial screen G11 displayed when the remote control application executing unit 35 of the present preferred embodiment is run. The initial screen G11 has an "advanced setting" key K12 which is different from the initial screen G4 of FIG. 9D. An "access" key K11 has the same function as the "access" key K0 of FIG. 9D.

Figure 23B:
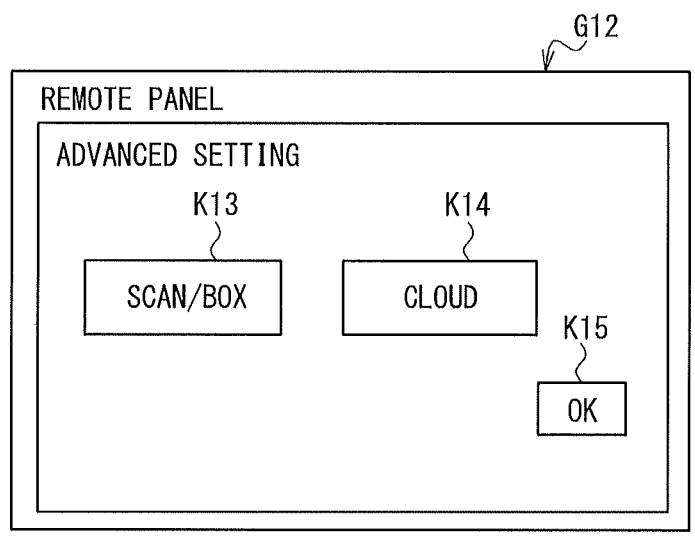

As the "access" key K11 is pressed, the information processing device 2 and the portable information terminal 3 start establishing communication therebetween. As the "advanced setting" key K12 is pressed, a screen G12 as illustrated in FIG. 23B is displayed and the information processing system 1 enters the mode in which the user is allowed to choose whether to configure in advance the destination to access or to have the destination automatically configured. In this mode, the user is allowed to choose for each destination including the destination to access for using the cloud service, the destination to save the scan image file generated by the information processing device 2 through reading operation and the destination to send the file in the information processing device 2.

Figure 23C:
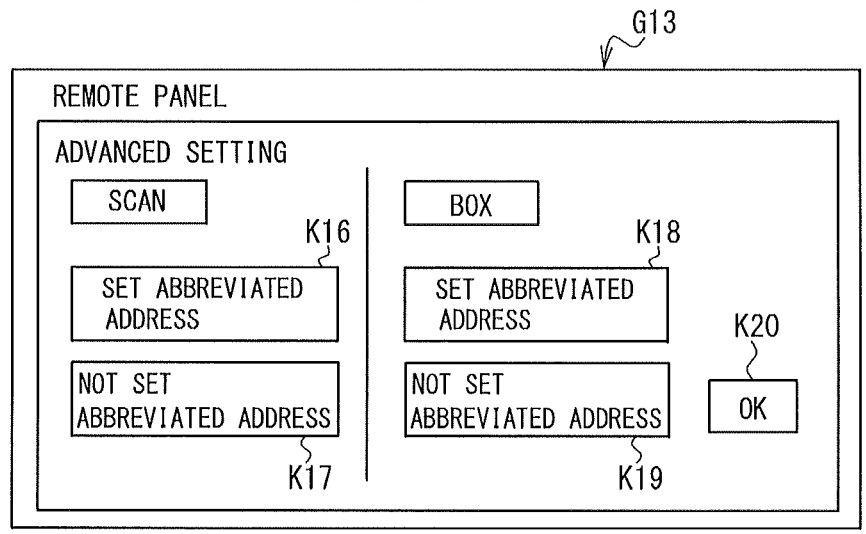

After a "scan/BOX" key K13 on a screen G12 as illustrated in FIG. 23B is pressed, a screen G13 as illustrated in FIG. 23C is displayed. The screen G13 of FIG. 23C has operational keys K16 and K17. By pressing the operational key K16, the user is allowed to give an instruction to configure the destination to save the scan image file generated by the information processing device 2. By pressing the operational key K17, the user is allowed to give an instruction not to configure the destination to save the file. The screen G13 also has operational keys K18 and K19 and an "OK" key K20. By pressing the operational key K18, the user is allowed to give an instruction to configure the destination to send the file in the information processing device 2. By pressing the operational key K19, the user is allowed to give an instruction not to configure the destination to send the file.

Figure 23D:
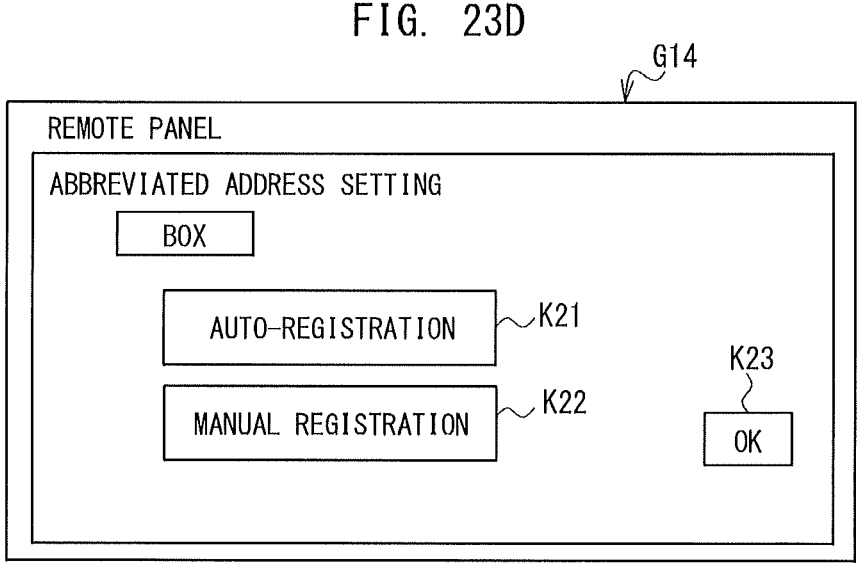

After the operational key K18, for instance, is pressed on the screen G13, a screen G14 as illustrated in FIG. 23D is displayed. The screen G14 has operational keys K21 and K22 and an "OK" key K23. By pressing the operational key K21, the user is allowed to give an instruction to have the destination to send the file automatically configured and registered. By pressing the operational key K22, the user is allowed to give an instruction to configure the destination to send the file and register by manual. Even when the operational key K17 of the screen G13 is pressed, the screen the same as one of FIG. 23D is displayed.

Figure 23E:
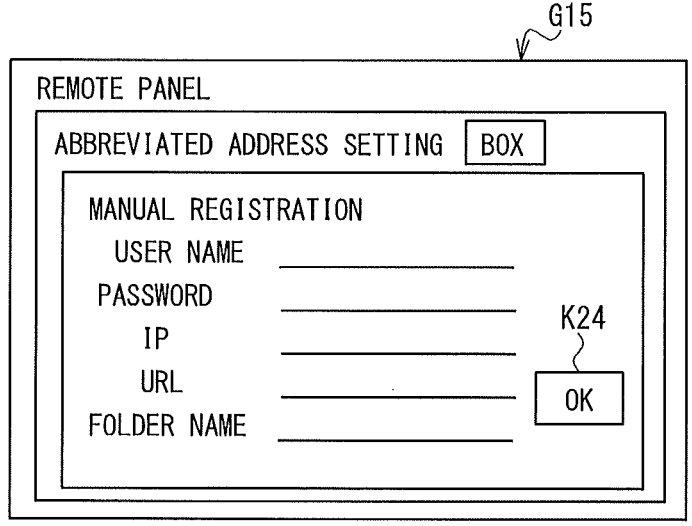

After the operational key K22 is pressed on the screen G14, a screen G15 as illustrated in FIG. 23E is displayed. The screen G15 has a field allowing the user to input the folder name which is different from the manual setting screen G5 of FIG. 12. Except for the field, everything is the same as the manual setting screen G5, so it won't explain again.

Figure 23F:
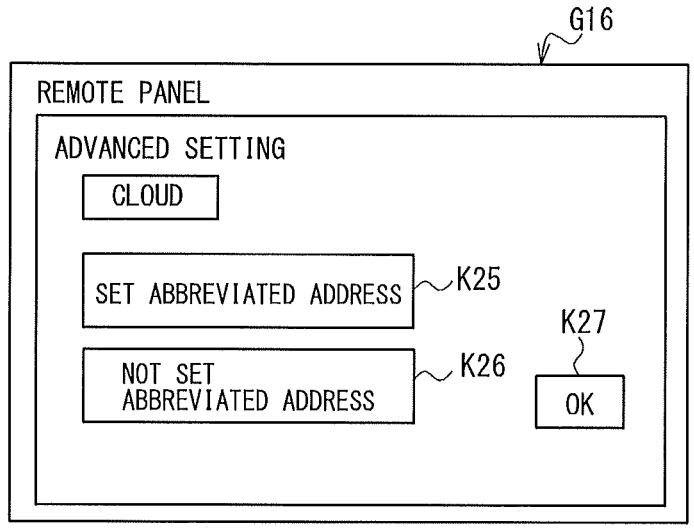

After a "cloud" key K14 on the screen G12 as illustrated in FIG. 23B is pressed, a screen G16 as illustrated in FIG. 23F is displayed. The screen G16 of FIG. 23F has operational keys K25 and K26 and an "OK" key K27. By pressing the operational key K25, the user is allowed to give an instruction to configure the address of the service providing server 4 with which the information processing device 2 establishes communication. By pressing the operational key K26, the user is allowed to give an instruction not to configure the address of the service providing server 4.

Figure 23G:
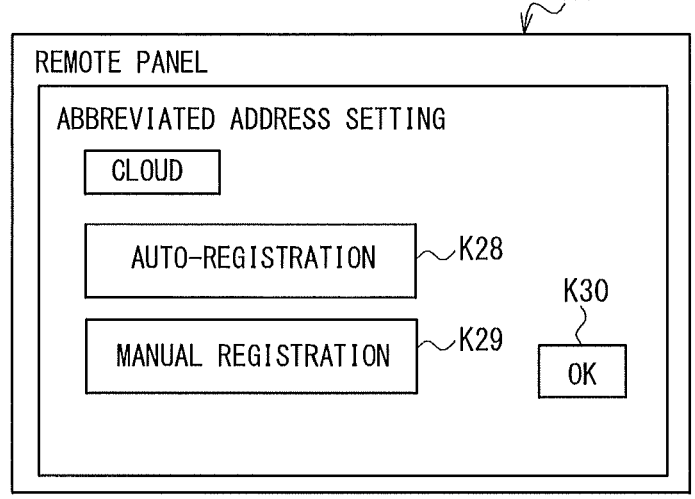

After the operational key K25, for instance, is pressed on the screen G16 is pressed, a screen G17 as illustrated in FIG. 23G is displayed. The screen G17 is the same screen as FIG. 23D. The screen G17 has operational keys K28 and K29 and an "OK" key K30. By pressing the operational key K28, the user is allowed to give an instruction to have the address of the service providing server 4 automatically configured. By pressing the operational key K29, the user is allowed to give instruction to configure and register the address by manual.

Figure 23H:
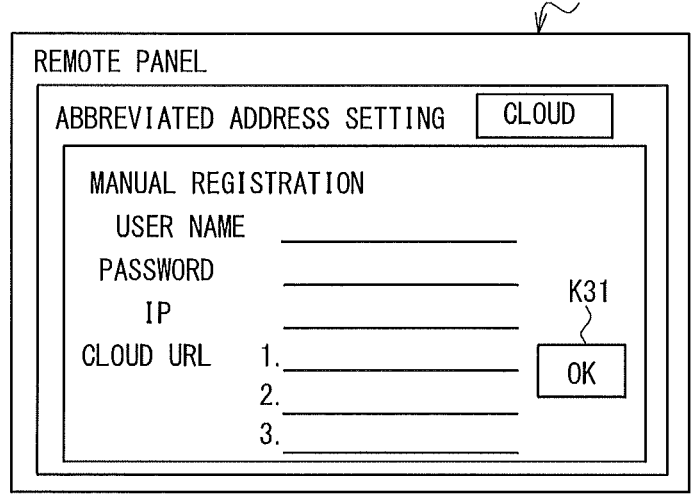

After the operational key K29 is pressed on the screen G17, a screen G18 as illustrated in FIG. 23H is displayed. On the screen G18, the user is allowed to input multiple URLs of the service providing servers 4. Except for that, everything is the same as the manual setting screen G5 of FIG. 12, so it won't explain again.

When the "OK" key K15, K20, K23, K24, K27, K30 or K31 displayed on the respective screens 23B to 23H is pressed, the screen is returned to the screen one displayed before the screen including the pressed "OK" key.

The information processing system 1 having the mode is capable of allowing the user to choose whether to configure in advance the destination (address) that should be accessed by the information processing device 1 when the remote control application executing unit 35 starts running by him/herself or to have the destination automatically configured, resulting in improvement in user-friendliness of the information processing system 1.

(7) After the remote control application executing unit 35 starts running, the application executing unit 32, 33 or 34 may be run. In this case, the portable information terminal 3 of the present preferred embodiment displays the manual setting screen. The portable information terminal 3 is not always necessary to display the manual setting screen. After the application executing unit 32, 33 or 34 runs, the access information may be generated and sent to the information processing device 2 from the portable information terminal 3 as well as the case where the remote control application executing unit 35 runs.

(8) In the present preferred embodiment described above, the information processing device 2 is shown to be one of MFPs with multiple functions such as scan function, print function and box function, for example. The information processing device of the present invention is not necessarily the device such as the MFPs including multiple functions.

The information processing device of the present invention may be a device with single function such as devices including a specialized scan device with a function to send image data generated by reading a document to outside over the network 5, or a specialized printer device with a function to produce a printed output based on the image data received from the outside over the network 5. Alternatively, the information processing device 2 may be a network storage connected to a network such as LAN in the office.

(9) Although in the above-described present preferred embodiment, one cloud service is provided by one service providing server 4, one cloud service may be provided by multiple service providing servers 4 through cooperation with each other.

(10) According to the present preferred embodiment, the portable information terminal 3 and the information processing device 2 establish short distance radio communication such as NFC (Near Field Communication). It is not limited to the short distance radio communication. More specifically, the portable information terminal 3 and the information processing device 2 may establish communication over the network such as LAN.

What is claimed is:

1. An information processing system comprising a portable information terminal and an information processing device that allow communication between each other, said portable information terminal operating said information processing device by remote control, wherein
said portable information terminal includes:
a first application executing part for executing a first application that acquires screen information indicating a screen with which a user makes remote operation from said information processing device and that displays the screen based on the acquired screen information;
a second application executing part for executing a second application that is independent of said first application and that accesses a destination of a server on a network by access information;
an application detecting part for detecting whether the second application is running while the first application is running; and
an informing part for automatically sending the access information to said information processing device when said application detecting part detects that the second application is running while the first application is running,
said information processing device includes:
a screen creating part for creating the screen for accessing the destination based on said access information in response to receiving said access information; and
a transmitting part for sending the screen information indicating the screen created by said screen creating part to said portable information terminal, and
said first application executing part displays the screen based on the screen information received from said transmitting part.

2. The information processing system according to claim 1, wherein
the screen created by said screen creating part includes at least one operational key, by pressing which the user is allowed to give an instruction to said information processing device to access the destination shown by said access information.

3. The information processing system according to claim 2, wherein
said information processing device and said portable information terminal use a predetermined service provided by a server with an access to said server over a network,
said second application executing part is brought into operation to use said predetermined service,
said access information is used to access said predetermined service which is accessed by said second application executing part, and
said operational key is pressed to give an instruction to make said information processing device establish communication with said server and access said predetermined service.

4. The information processing system according to claim 3, wherein
said portable information terminal stores in advance authentication information required for using said predetermined service, said informing part sending said authentication information required for using said predetermined service to said information processing device when sending said access information,
said information processing device further includes a display part on which the screen created by said screen creating part is displayed,
in response to receiving said authentication information from said portable information terminal, said information processing device stores therein said authentication information with said operational key corresponding to said authentication information, and
when said operational key of the screen displayed on said display part corresponds to any authentication information stored in advance, said authentication information stored in advance corresponding to said operational key is used for the access to said predetermined service if said operational key is pressed.

5. The information processing system according to claim 3, wherein
said information processing device includes a print function,
the destination to access is a file in said server opened by said second application executing part, and
the screen created by said screen creating part further includes a preview area, in which how a printed output is produced based on the file is shown in advance, the preview being shown by obtaining the file accessed by said second application executing part based on said access information.

6. The information processing system according to claim 3, wherein
said information processing device sends a notification to said portable information terminal when direct communication with said predetermined service is restricted, and
said portable information terminal, in response to receiving said notification, relays communication between said information processing device and said predetermined service.

7. The information processing system according to claim 6, wherein
said portable information terminal sends said access information required for the access to said portable information terminal to said information processing device when said portable information terminal receives said notification from said information processing device in case of sending the file from said information processing device to said predetermined service, said portable information terminal thereby acquiring the file from said information processing device and relaying the acquired file to said predetermined service on behalf of said information processing device.

8. The information processing system according to claim 3, wherein
said predetermined service is a cloud service provided with a server which stores data over said network.

9. The information processing system according to claim 2, wherein
said second application executing part is brought into operation to access a folder stored in said portable information terminal, and
said operational key is pressed to give an instruction to make said information processing device send data to the folder which is being accessed by said second application executing part.

10. The information processing system according to claim 1, wherein
said information processing device includes the print function,
said second application executing part is brought into operation to access a file stored in said portable information terminal, and
the screen created by said screen creating part includes the preview area, in which how a printed output is produced based on the file is shown in advance, the preview being shown by obtaining the file accessed by said second application executing part based on said access information.

11. The information processing system according to claim 1, wherein
said portable information terminal further includes a shooting part for performing shooting operation,
said second application executing part is brought into operation to access a shot image generated through shooting operation performed by said shooting part and play the shot image, and
the screen created by said screen creating part includes the preview area, in which how a printed output is produced based on the shot image is shown in advance, the preview being shown by obtaining the shot image being accessed and played by said second application executing part based on said access information.

12. The information processing system according to claim 1, wherein
said portable information terminal displays the screen indicated by the screen information received from said transmitting part and a startup screen of said second application executing part by placing the screens side-by-side.

13. The information processing system according to claim 1, wherein
said portable information terminal displays the screen on which the user is allowed to input the destination that should be accessed by said information processing device as said access information when said application detecting part detects that said first application executing part is running as said second application executing unit is not running, and
said informing part sends said access information input through the screen to said information processing device.

14. An information processing device capable of establishing communication with a portable information terminal, said information processing device being operated by remote control via said portable information terminal, comprising:
- a screen creating part for creating a screen for accessing a destination of a server on a network by access information, the screen creating part creating the screen based on the access information in response to receiving said access information from said portable information terminal; and
- a transmitting part for sending screen information indicating the screen created by said screen creating part to said portable information terminal.

15. A non-transitory computer readable recording medium on which a program is recorded, said program executable on an information processing device capable of establishing communication with a portable information terminal, said program causing said information processing device to be operated by remote control via said portable information terminal, said program executed on said information processing device to function as a system comprising:
- a screen creating part for creating a screen for accessing a destination of a server on a network by access information, the screen creating part creating the screen based on the access information in response to receiving said access information from said portable information terminal; and
- a transmitting part for sending screen information indicating the screen created by said screen creating part to said portable information terminal.

16. A non-transitory computer readable recording medium on which a program is recorded, said program executable on a portable information terminal capable of operating an information processing device by remote control with a communication function, said program executed on said portable information terminal to function as a system comprising:
- a first application executing part for executing a first application that acquires screen information indicating a screen, with which the user makes remote operation, and that displays the screen based on said acquired screen information;
- a second application executing part for executing a second application that is independent of the first application and that accesses a destination of a server on a network by access information;
- an application detecting part for whether the second application executing part is running while the first application is running; and
- an informing part for automatically sending the access information to said information processing device when said application detecting part detects that the second application is running while the first application is running.

17. A portable information terminal capable of operating an information processing device by remote control with a communication function, comprising:
- a first application executing part for executing a first application that acquires screen information indicating a screen, with which the user makes remote operation, and that displays the screen based on said acquired screen information;
- a second application executing part for executing a second application that is independent of the first application and that accesses a destination of a server on a network by access information;
- an application detecting part for detecting whether the second application executing part is running while the first application is running; and
- an informing part for automatically sending the access information to said information processing device when said application detecting part detects that the second application is running while the first application is running.

* * * * *